(12) United States Patent
Seko

(10) Patent No.: US 7,554,676 B2
(45) Date of Patent: Jun. 30, 2009

(54) POSITIONAL MEASUREMENT SYSTEM AND LENS FOR POSITIONAL MEASUREMENT

(75) Inventor: Yasuji Seko, Kanagawa (JP)

(73) Assignee: Fuji Xerox Co., Ltd., Tokyo (JP)

( * ) Notice: Subject to any disclaimer, the term of this patent is extended or adjusted under 35 U.S.C. 154(b) by 654 days.

(21) Appl. No.: 10/940,766

(22) Filed: Sep. 15, 2004

(65) Prior Publication Data

US 2005/0185195 A1 Aug. 25, 2005

(30) Foreign Application Priority Data

Feb. 20, 2004 (JP) ............................ P2004-045123

(51) Int. Cl.
G01B 11/14 (2006.01)
G01C 3/00 (2006.01)
G01C 5/00 (2006.01)
G01J 5/02 (2006.01)
G01N 21/86 (2006.01)
G01V 8/00 (2006.01)
G01S 3/02 (2006.01)
G01S 5/14 (2006.01)
H04B 7/185 (2006.01)
G02B 17/00 (2006.01)

(52) U.S. Cl. ........................... 356/614; 356/3; 250/342; 250/559.29; 342/357.08; 342/450; 359/726; 359/727

(58) Field of Classification Search ....................... None
See application file for complete search history.

(56) References Cited

U.S. PATENT DOCUMENTS

| 2,444,770 | A | * | 7/1948 | Fyler | 708/812 |
| 2,520,635 | A | * | 8/1950 | Grey | 359/731 |
| 2,748,658 | A | * | 6/1956 | Bouwers | 359/731 |
| 3,026,413 | A | * | 3/1962 | Taylor | 250/339.14 |
| 3,353,022 | A | * | 11/1967 | Schwartz | 250/347 |

(Continued)

FOREIGN PATENT DOCUMENTS

JP 56028503 A * 3/1981

(Continued)

OTHER PUBLICATIONS

Yasuji Seko, New Light Measurement "Light Interference Lens Method", the Sixty-Third Joint Symposium related to Applied Physics Abstracts Book, p. 871, 24p-ZN-7, Japan Society of Applied Physics (Sep. 2002).

*Primary Examiner*—Gregory J Toatley, Jr.
*Assistant Examiner*—Gordon J Stock, Jr
(74) *Attorney, Agent, or Firm*—Sughrue Mion, PLLC

(57) ABSTRACT

A positional measurement system includes an electromagnetic wave source which emits an electromagnetic wave, a lens system which has a first lens surface, an electromagnetic wave shield section provided around a center axis of the first lens surface, and a second lens surface, and causes the electromagnetic wave having entered by way of the first lens surface exclusive of the electromagnetic wave shield section to exit from the second lens surface, to form an electromagnetic wave concentrated area at a position opposite the electromagnetic wave source, a receiving device which detects the electromagnetic wave concentrated area formed by the lens system, and a computing device which measures a position of the electromagnetic wave source based on information detected by the receiving device on the electromagnetic wave concentrated area.

30 Claims, 23 Drawing Sheets

U.S. PATENT DOCUMENTS

| | | | | |
|---|---|---|---|---|
| 3,438,695 | A * | 4/1969 | Matsui | 359/731 |
| 3,474,242 | A * | 10/1969 | Forrant | 362/7 |
| 3,853,405 | A * | 12/1974 | Adler et al. | 356/141.4 |
| 4,106,855 | A * | 8/1978 | Coon | 359/723 |
| 4,554,448 | A * | 11/1985 | Sillitto | 250/216 |
| 4,801,202 | A * | 1/1989 | Wilcox | 356/139.01 |
| 4,912,334 | A * | 3/1990 | Anderson | 250/495.1 |
| 5,555,207 | A * | 9/1996 | Barker | 324/121 R |
| 5,793,538 | A * | 8/1998 | Cameron et al. | 359/731 |
| 5,821,526 | A * | 10/1998 | Krishna | 250/203.6 |
| 6,097,550 | A * | 8/2000 | Kimura | 359/729 |
| 6,169,637 | B1 * | 1/2001 | Tsunashima | 359/726 |
| 6,788,210 | B1 * | 9/2004 | Huang et al. | 340/612 |
| 7,009,713 | B2 * | 3/2006 | Seko et al. | 356/498 |
| 7,435,940 | B2 * | 10/2008 | Eliasson et al. | 250/221 |
| 7,442,914 | B2 * | 10/2008 | Eliasson et al. | 250/221 |
| 2001/0006434 | A1 * | 7/2001 | Yoo et al. | 359/727 |
| 2002/0097505 | A1 * | 7/2002 | DeLong | 359/726 |
| 2004/0051880 | A1 | 3/2004 | Seko et al. | |

FOREIGN PATENT DOCUMENTS

| | | |
|---|---|---|
| JP | 62-000880 A | 1/1987 |
| JP | 02-013798 A | 1/1990 |
| JP | 4-062491 A | 2/1992 |
| JP | 4-315974 A | 11/1992 |
| JP | 4-315982 A | 11/1992 |
| JP | 6-042919 A | 2/1994 |
| JP | 7-325096 A | 12/1995 |
| JP | 11-074844 A | 3/1999 |
| JP | 2000-171209 | 6/2000 |
| JP | 2000-339746 A | 12/2000 |
| JP | 2004-212328 A | 7/2004 |

* cited by examiner

OUTER DIAMETER φ2.27

POSITION OF LIGHT SOURCE (x, y, z) = (1000, 0, 0)

OUTER DIAMETER φ2.57

POSITION OF LIGHT SOURCE (x, y, z) = (500, 0, 0)

POSITIONAL MEASUREMENT SYSTEM AND LENS FOR POSITIONAL MEASUREMENT

BACKGROUND OF THE INVENTION

1. Field of the Invention

The present invention relates to a positional measurement system which measures a three-dimensional position of the source of electromagnetic waves, through use of a lens system and a mirror system which form an area where electromagnetic waves, such as light or radio waves, are concentrated, and a receiving device for detecting the concentrated area of electromagnetic waves.

2. Description of the Related Art

A conventionally known method for measuring a three-dimensional position of an illuminant (or an object having high luminance) is to compute coordinates of the illuminant according to the principle of triangulation which takes a distance between two digital cameras as a base line, by photographing the illuminant with the digital cameras. However, this method requires two or more cameras and involves problems of high costs and troublesome positional adjustment of optical axes of the respective cameras to the base length. Additional problems are the necessity for photographing an object after obtaining correct focus so as to prevent generation of an out-of-focus image of the object and the ability to perform, at most, ten photographing operations, or thereabouts, per second. Put another way, in the case of an object which moves at high speed, focusing fails to catch up with the motion of the object. This in turn results in a problem of a failure to measure a position or another problem of the object being out of focus, which drastically deteriorates positional accuracy or the power of resolution.

A light interference method is known as a method for measuring the position of an illuminant with high accuracy. However, this method requires a large number of components and high costs. Further, assembly of these components requires a high degree of positional accuracy, which presents a problem of high costs and consumption of efforts. Moreover, an automatic focusing mechanism is required, which has a drawback of inability to perform high-speed measurement or the like. Moreover, the laser beam is radiated on an object after having been formed in the shape of a spot or a line, and hence safety precautions must be taken.

As mentioned before, in order to measure the three-dimensional position of the illuminant with high accuracy and high resolution, the large number of components and high costs are required. In addition, consumption of much time for focusing is required, thus there is difficulty in increasing the speed of measurement. Moreover, under the light interference method, assembly requires high positional accuracy. Hence, the method has problems of high costs and requirement of taking safety precautions because of using laser. Another problem of the light interference method is complicated computation for measuring a position from the interference pattern.

A method for capturing a point of illumination with a special lens and a special sensor has already been provided. However, under this method, highly-accurate measurement of a position of a light source located several meters away requires a hemispherical lens having a large diameter. Thus, this method involves a problem of an increase in the weight of the lens and costs of materials. Specifically, under this method, a practical device encounters difficulty in highly-accurately measuring the position of the light source located several meters away.

SUMMARY OF THE INVENTION

Accordingly, the present invention has been made in view of the above circumstances and provides a compact and lightweight positional measurement system capable of simply measuring a position at low cost by using electromagnetic waves.

In an embodiment, the present invention includes a positional measurement system. The system includes an electromagnetic wave source which emits an electromagnetic wave, a lens system which has a first lens surface, an electromagnetic wave shield section provided around a center axis of the first lens surface, and a second lens surface, and causes the electromagnetic wave having entered by way of the first lens surface exclusive of the electromagnetic wave shield section to exit from the second lens surface to form an electromagnetic wave concentrated area at a position opposite the electromagnetic wave source, a receiving device which detects the electromagnetic wave concentrated area formed by the lens system, and a computing device which measures a position of the electromagnetic wave source based on information detected by the receiving device on the electromagnetic wave concentrated area.

According to another aspect of the present invention, a positional measurement system is formed by including an electromagnetic wave source which emits an electromagnetic wave, a mirror which reflects the electromagnetic wave to thereby form an electromagnetic wave concentrated area, an electromagnetic wave component which is interposed between the electromagnetic wave source and the mirror, and imparts a change to a traveling direction of the electromagnetic wave, a receiving device which detects the electromagnetic wave concentrated area formed by the mirror, and a computing device which measures a position of the electromagnetic wave source based on information detected by the receiving device on the electromagnetic wave concentrated area.

A lens system of the present invention has a first lens surface, an electromagnetic wave shield section provided around a center axis of the first lens surface, and a second lens surface. Preferably, an electromagnetic wave entered by way of the first lens surface exclusive of the electromagnetic wave shield section is caused to exit from the second lens surface to form an electromagnetic wave concentrated area.

As described above, according to the present invention, it is possible to provide a compact, lightweight positional measurement system capable of measuring a position simply and at low costs by using electromagnetic waves.

BRIEF DESCRIPTION OF THE DRAWINGS

Embodiments of the present invention will be described in detail based on the following figures, wherein:

FIGS. 3A and 3B are views showing a ring image formed on an image sensor 5, wherein FIG. 3A shows a ring image formed when the light source is situated in the optical axis spaced 1000 mm from the front end of the lens and FIG. 3B shows a ring image formed when the light source is situated in the optical axis spaced 500 mm from the front end of the lens;

FIGS. 4A and 4B are views describing formation of a light ring image, wherein FIG. 4A is a front view of the lens 2 and FIG. 4B is a view of the light ring image;

DETAILED DESCRIPTION OF THE INVENTION

Embodiments of a positional measurement system according to the present invention will be described hereinbelow. The present invention is for measuring the position of an electromagnetic wave source. The electromagnetic waves preferably have a wavelength falling within a range of 300 nm to 1 m and are light (including UV rays, visible light, and infrared light) or radio waves falling within a range from a millimeter wave band to a micrometer wave band.

First Embodiment

Figure 1:
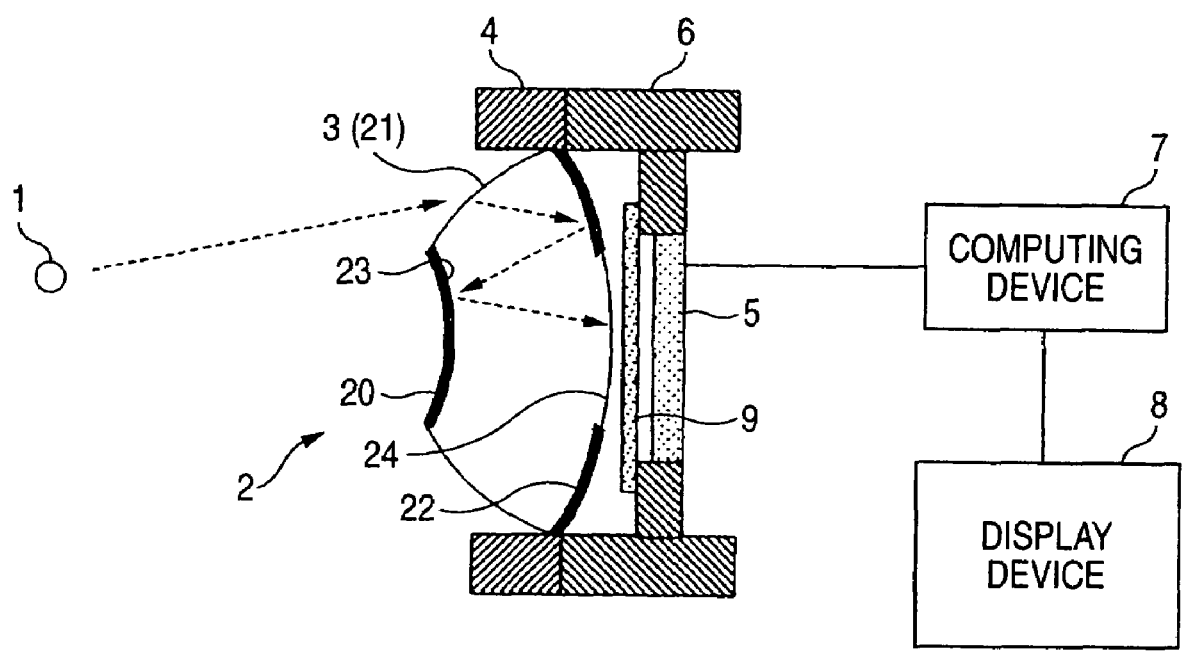
FIG. 1 is a conceptual rendering showing a first embodiment of a positional measurement system according to the present invention.

FIG. 1 is a conceptual rendering showing a first embodiment of a positional measurement system of the present invention. As illustrated, the present embodiment comprises an LED light source 1 for emitting light (infrared light) having a wavelength of, e.g., 900 nm, a lens (lens system) 2 having a toroidal (ring-shaped) entrance window 3 for permitting entrance of the light emitted from the LED light source 1 and having a large spherical aberration, an imaging sensor 5 disposed rearward of the lens, a computing device 7 for processing a signal of a light ring image (which will be described later) photographed by the image sensor 5, through computation, and a display device 8 for displaying coordinates of the position of the light source computed by the computing device. An infrared light transmittance filter 9 for permitting transmittance of infrared radiation having a wavelength shorter than 900 nm or the like is preferably disposed immediately before the image sensor 5, to thus exclude light (noise) exclusive of the LED light source 1. The optical lens 2 is retained by a lens holder 4, and the image sensor 5 is retained by an image sensor holder 6. The image sensor 5 can be constituted of, e.g., a CCD.

In the present embodiment, the light originating from the LED light source 1 is caused to enter the positional measurement system by way of the ring-shaped entrance window 3. The light is then gathered by the optical lens 2 having a large spherical aberration, to thus form a ring of light (a light ring image) which is a light concentrated area (an electromagnetic wave concentrated area). The light ring image is detected by the image sensor 5. The detected signal is processed by the computing device 7 through computation, to thus measure the position of the light source 1. Here, the ring shape encompasses the shape of an entire ring, the shape of a part of a ring, and deformed shapes of a ring.

Figure 2:
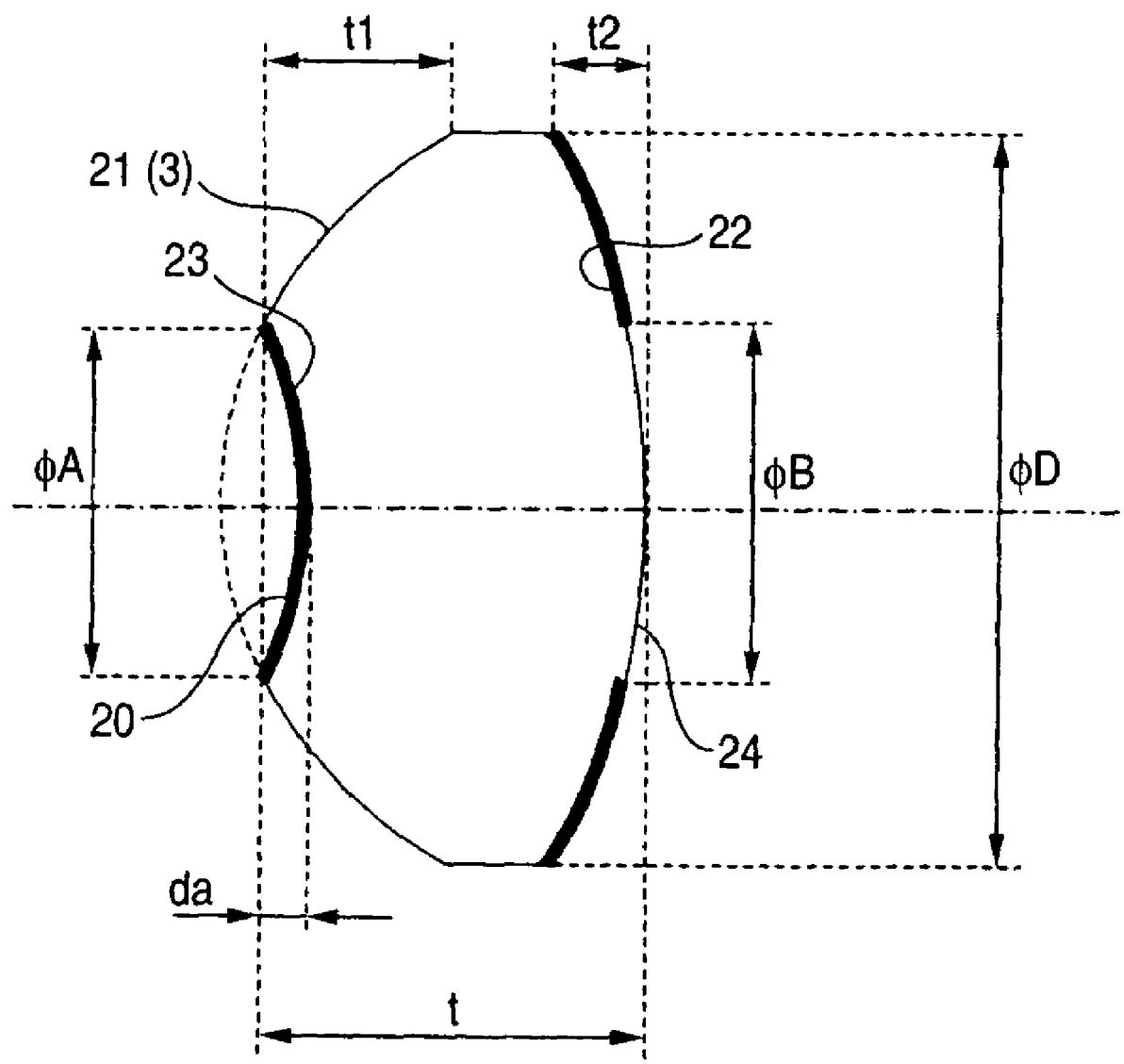
FIG. 2 is a view showing an example lens 2 having a ring-shaped entrance window 3.

FIG. 2 is a view showing an example of the lens 2 having the ring-shaped entrance window 3. This drawing is a cross-sectional view taken along the optical axis of the lens 2. As illustrated, the lens 2 has an electromagnetic wave shield section (light shield section) 20 provided around the center axis (optical axis) of the first lens surface and causes the light having entered by way of a first lens surface 21 (the ring-shaped entrance window 3 shown in FIG. 1) exclusive of the light shield section 20 to exit from a second lens surface 24, thereby forming the image of a light ring, which is the light concentrated area, at a position opposite the light source. For these reasons, a first mirror surface 22 is disposed at a position distant from the center axis of the second lens surface opposing the first lens surface 21, and a second mirror surface 23 is disposed at the position of the light shield section 20 opposing the second lens surface 24. Each of the first lens surface 21, the second lens surface 24, and the second mirror surface 23 is a convex shape, and the first mirror surface 22 is a concave shape. Thereby, the light originating from the light source first enters the first lens surface 21, then undergoes reflection on the first mirror surface 22 and on the second mirror surface 23, and exits to the outside from the second lens surface 24.

A material having a refraction index of, e.g., 1.82, is used for the lens 2, the first lens surface is a convex shape and is a radius of curvature R of 22 mm, the second lens surface is a convex shape and is an R of 65 mm, the first mirror surface is a concave shape and is an R of 65 mm, and the second mirror surface is a convex shape and an R of 60 mm. The thickness "t" of the optical lens 2 is 9.0 mm, the outer diameter ΦD of the lens 2 is Φ22 mm, the outer diameter ΦA of the second mirror 23 is Φ12 mm, and the outer diameter ΦB of the second lens surface 24, i.e., the inner diameter ΦB of the first mirror surface, is Φ12 mm. The second mirror surface 23 is a convex shape, and the center of the mirror surface recedes from the front end face of the lens by 0.3 mm (designated by "da" in the drawing). The thickness t1 of the first lens surface is 2.12 mm, and the thickness t2 of the second lens surface is 0.94 mm.

The position of a focal point of a paraxial ray relative to a straight line at infinity of the lens 2 is located 2.5 mm behind the second lens surface. The position of the focal point of the paraxial ray employed herein means the position of a focal point computed on the premise that the first lens surface, the second lens surface, the first mirror surface, and the second mirror surface all affect the light located in the vicinity of the optical axis. Specifically, the focal length is computed on the premise that the light located in the vicinity of the optical axis exits after having undergone refraction on a virtual first lens surface, reflection on a virtual first mirror surface, reflection on the real second mirror surface, and refraction on the real second lens surface. The position of the focal point is 2.5 mm behind the real second lens surface. Hence, in the case of the real lens system shown in FIG. 2, wherein light passes through the area having a large spherical aberration, the light passes through a position which is closer to the light source than to the focal point. In the present embodiment, the image sensor 5 is disposed at a distance of 0 to 2 mm from the second lens surface. The nature of the light ring image which will actually be formed was examined by use of the lens 2 through simulation to be described below.

Figure 3A:
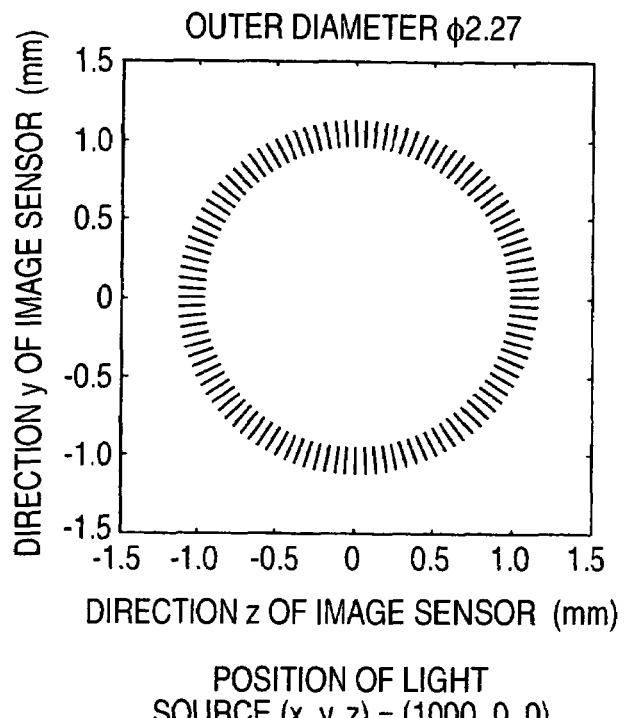
Figure 3B:
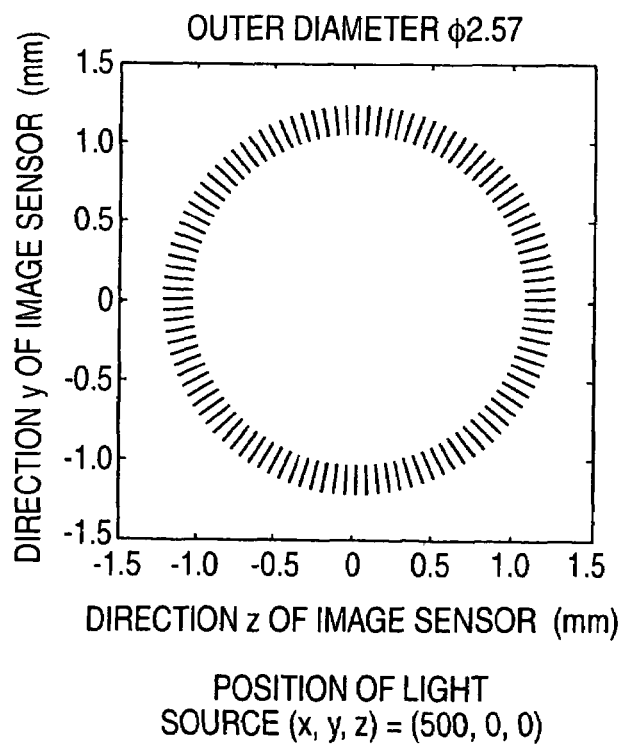

FIGS. 3A and 3B are views showing the ring image formed on the image sensor 5. FIG. 3A shows a case where the light source is disposed on the optical axis spaced from the front end of the lens by 1000 mm, and FIG. 3B shows a case where the light source is disposed on the optical axis spaced from the front end of the lens by 500 mm. Provided that the optical axis is taken as an "x" axis, the vertical direction is taken as a "y" axis, and a horizontal direction is taken as a "z" axis, coordinates of the position of the light source shown in FIGS. 3A and 3B are expressed as (1000, 0, 0) and (500, 0, 0). The horizontal axis shown in FIGS. 3A and 3B represents a "z" direction (mm) of the image sensor, and the vertical axis in the same drawings represents a "y" direction (mm) of the image sensor.

The position of the light source is measured in accordance with the position and size of the ring. As shown in FIGS. 3A and 3B, the positions of the light source are (1000, 0, 0) and (500, 0, 0). The center position of the ring is situated at the point of origin (0, 0) of the image sensor. The outer diameter of the ring is enlarged from Φ2.27 mm to Φ2.57 mm. Since the relationship between the outer diameter of the ring and the distance from the light source has already been determined, the "x" coordinate of the light source can be determined if the outer diameter of the ring is measured.

The ring image is formed by the light passing through a point formed as a result of the first lens surface 21, which is to be a ring-shaped entrance window shown in FIG. 2, having been plotted radially from the center of the lens. Here, attention must be paid to the concept that the ring image shown in FIGS. 3A and 3B is formed not as a result of the light entered the ring-shaped entrance window having been simply being projected in a reduced manner, but from the light rays having entered the ring-shaped entrance window overlapping one another on the image sensor, thereby forming the light ring image (lines overlap each other in FIGS. 3A and 3B and, hence, become difficult to discern). This will now be described in plain language.

Figure 4A:
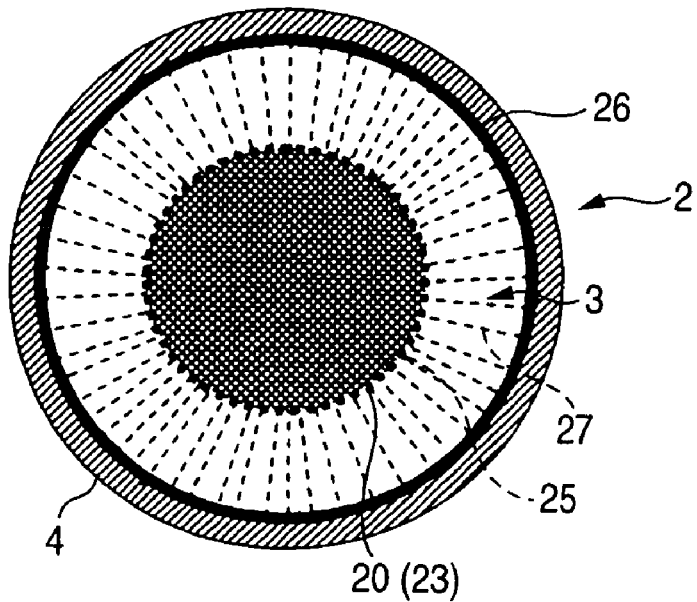
Figure 4B:
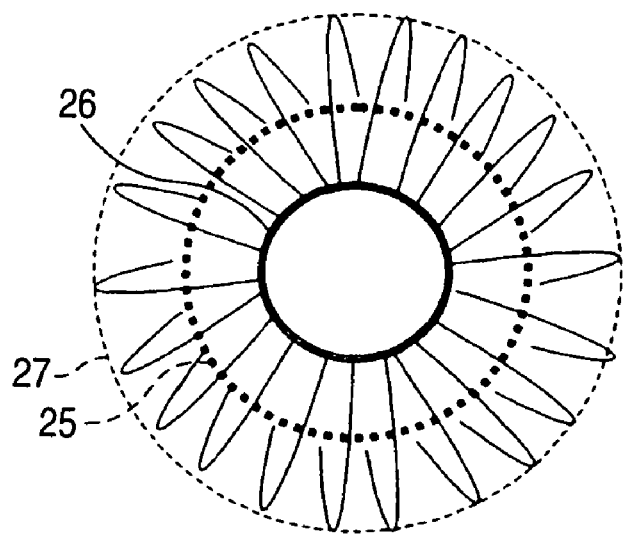

FIGS. 4A and 4B are views for describing formation of a light ring image. FIG. 4A is a front view of the lens system, and FIG. 4B is an image of the light ring image. In the drawing, a light shield section 20 (the second mirror surface 23 is provided on the back thereof) is provided at the inside of the ring-shaped entrance window 3, and the lens holder 4 is provided at the outside of the light shield section 20. The light having passed through the ring-shaped entrance window 3 of the lens 2 includes the light passing through an outer peripheral section 26 as well as the light passing through an inner peripheral section 25 of the ring-shaped entrance window 3. An outer periphery of the ring image formed on the image sensor is not formed by the light having passed through the neighborhood of the outer peripheral section 26 of the ring-shaped entrance window 3 or the light having passed through the neighborhood of the inner peripheral section 25, but by the light having passed through the neighborhood of an intermediate section 27 of the ring-shaped entrance window 3. As shown in FIG. 4B, the light rays having passed through the ring-shaped entrance window 3 overlap each other on the image sensor, thereby forming a light ring image. Therefore, an abrupt peak of light intensity appears in the outermost periphery of the light ring image and can be photographed as a clear image by the image sensor 5. Next, the light ring image obtained after movement of the light source was examined through simulation.

Figure 5:
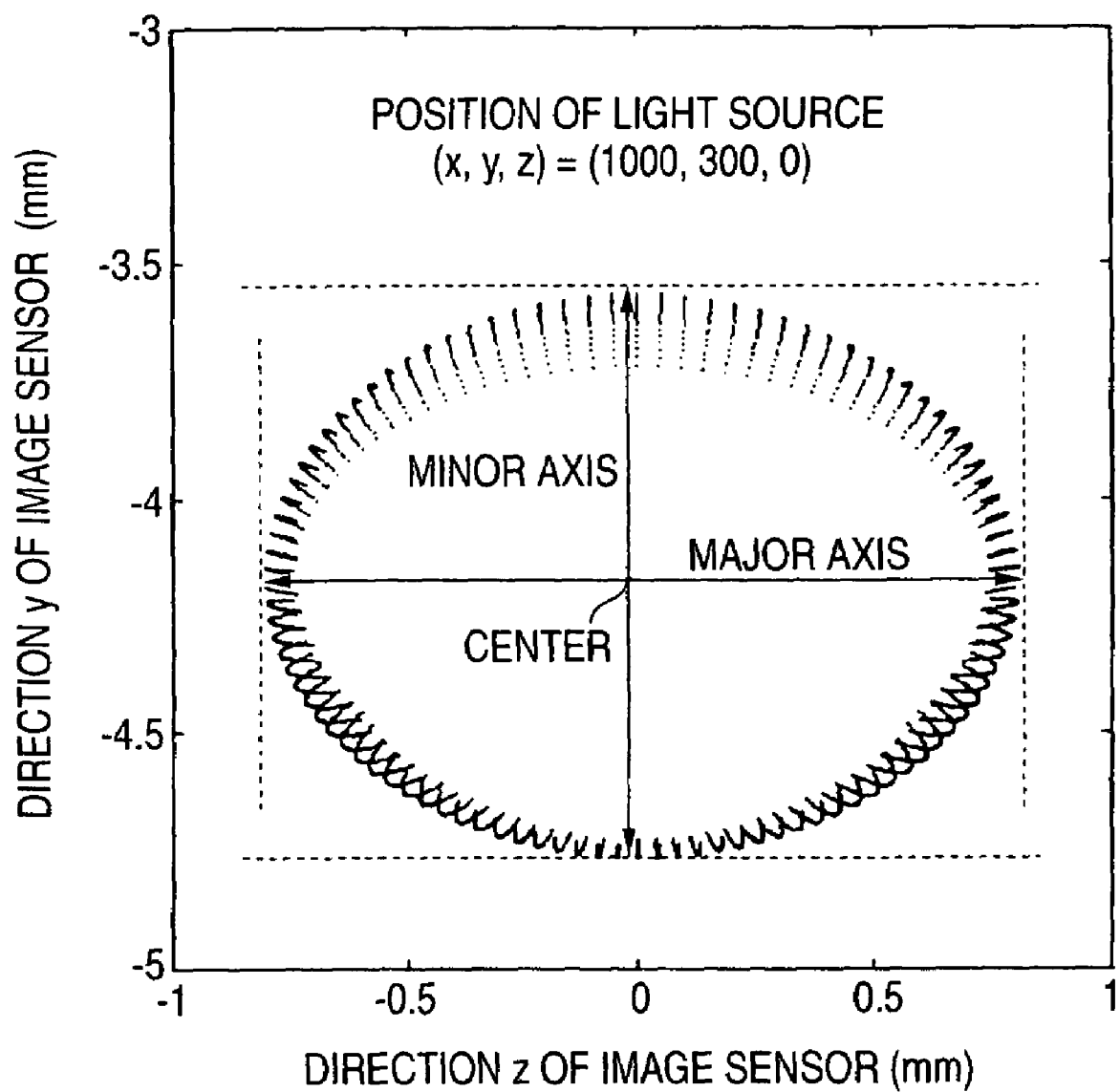
FIG. 5 is a view showing an example light ring image formed when the position of the light source is greatly deviated from the optical axis.

FIG. 5 is a view showing an example of the light ring image obtained when the position of the light source has gone greatly out of the optical axis. The present embodiment is directed toward examination of the ring image through simulation, wherein the ring image was obtained as a result of the light source having been moved upward from the position (1000, 0, 0) to another position (1000, 300, 0) over 300 mm along the "y" axis. The horizontal axis in the drawing represents the "z" direction (mm) of the image sensor, and the vertical axis in the same represents the "y" direction (mm) of the image sensor. As illustrated, the light ring image is deformed from a circle to an ellipse. The three-dimensional position of the light source can be measured by measuring the center position, the major axis, and the minor axis of the ellipse. The principle of measurement is provided below.

Figure 6:
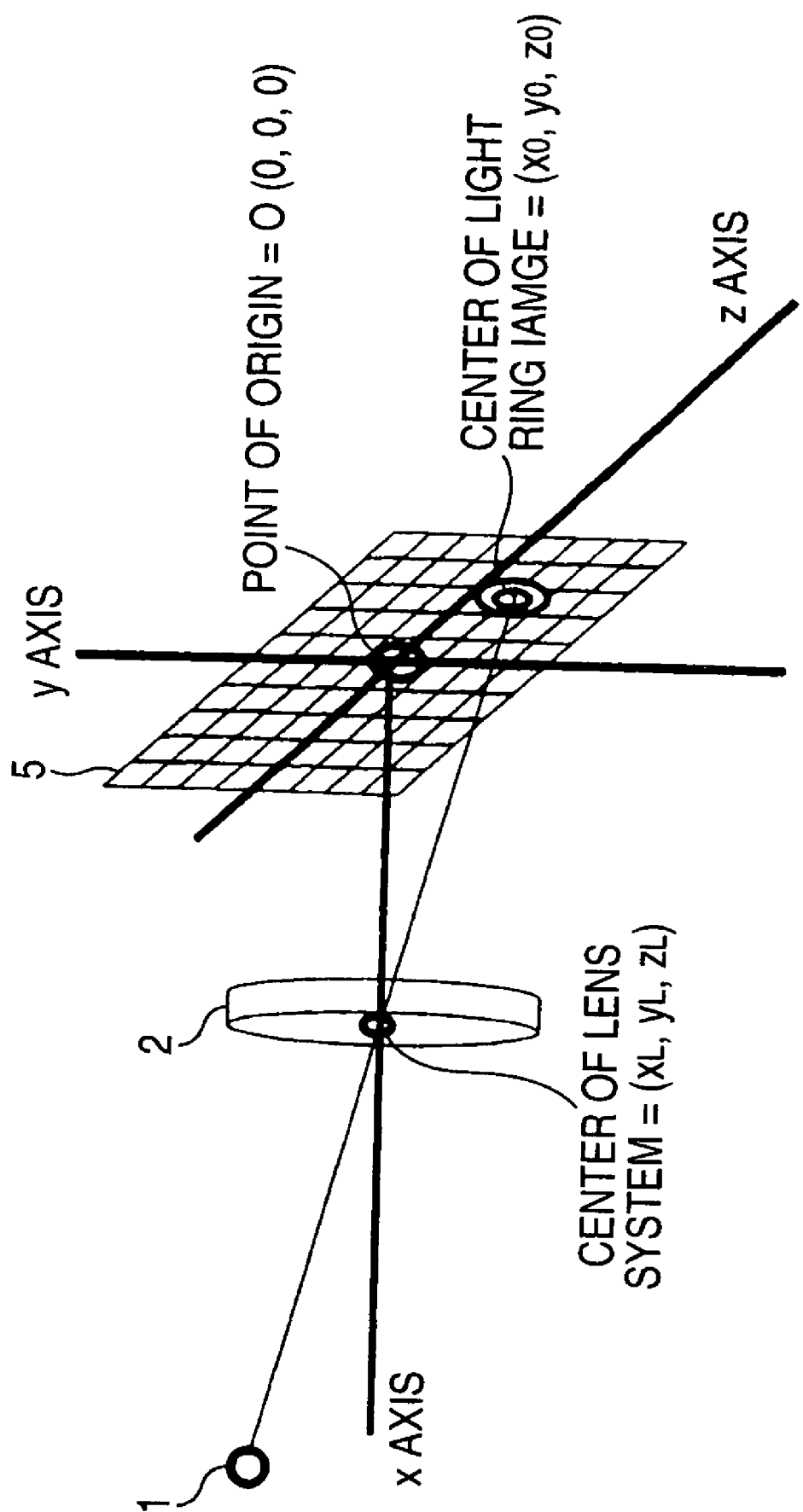
FIG. 6 is a view showing an example relationship between the light source, a lens system, and the light ring image.

FIG. 6 is a view showing an example relationship among the light source, the lens system, and the light ring image. As illustrated, on assumption that the center position of the light ring image on the image sensor 5 is taken as $(y_0, z_0)$ and the position of the image sensor on the optical axis is taken as $x_0$, the three-dimensional position of the center of the light ring image can be expressed as $(x_0, y_0, z_0)$. The light source 1 is present approximately along the straight line connecting the center $(x_L, y_L, z_L)$ of the lens system 2 and the center $(x_0, y_0, z_0)$ of the light ring image. On the assumption that the coordinates of the light source 1 are taken as $(x, y, z)$, the light source can be described as Expression (1) provided below.

[Numerical Expression 1] \hfill Ex. (1)

$$\begin{bmatrix} x \\ y \\ z \end{bmatrix} = \begin{bmatrix} x_0 \\ y_0 \\ z_0 \end{bmatrix} + m \begin{bmatrix} x_L - x_0 \\ y_L - y_0 \\ z_L - z_0 \end{bmatrix}$$

Here, "m" designates a value representing a distance from the light source 1 to the center of the lens system 2 in terms of integral multiples of a distance from the center of the lens system 2 to the center of the light ring image on the image sensor 5. This "m" is understood to be determined from the length of the major axis and that of the minor axis, both belonging to the ring image, and hence three-dimensional coordinates of the light source 1 can be determined.

In the present embodiment, as mentioned previously, the infrared radiation transmittance filter 9 for removing the light other than the light originating from the LED light source 1 is disposed in front of the image sensor 5. However, even when attached to the front surface or back surface of the lens system 2, the infrared radiation transmittance filter 9 can eliminate noise light.

The present embodiment yields the following effect. First, the present system utilizes a mirror in the lens system, and hence a large spherical aberration is obtained. Therefore, the position of the light source located several meters or thereabouts distant can be measured with high accuracy. The formed light ring image is photographed by a large number of pixels provided on the image sensor. Hence, positional measurement which is higher in resolution than a conventional pixel pitch becomes possible. Alternatively, since the mirror is formed on the lens surface, a comparatively long optical path length can be obtained even by a single lens. Thus, the lens system can be miniaturized.

The second mirror surface of the lens is utilized for forming the ring-shaped entrance window, and hence a reduction in the number of components and miniaturization and weight reduction of the lens system can be attained. The lens surface, the mirror surface, and the light shield section are fabricated into a single lens, and hence operations for assembling and aligning these components become unnecessary, thereby enhancing the performance of the lens system and cutting costs of the same. An outer periphery of the light ring image formed on the image sensor is formed as a result of superimposition of the light having passed through the neighborhood of an intermediate portion of the ring-shaped entrance window. Hence, the position of a clear ring image can be measured with high accuracy at all times.

Moreover, the outer periphery of the light ring image formed on the image sensor is formed as a result of the light rays passed through the neighborhood of the intermediate of the ring-shaped entrance window superimposing one on another. Hence, the ring image is not dependent on the geometrical accuracy of the ring-shaped entrance window or variations therein, but on the accuracy of the lens. Therefore, highly accurate measurement becomes possible. Moreover, the light ring image formed on the image sensor is not dependent on the position of the light source and has a clear contour. Thus, positional measurement can be performed without use of a focusing mechanism. Accordingly, the focusing time is unnecessary, and high-speed measurement can be performed. Moreover, the focusing mechanism is not required, and hence a compact, low-cost, and highly reliable system can be acquired.

Second Embodiment

Figure 7:
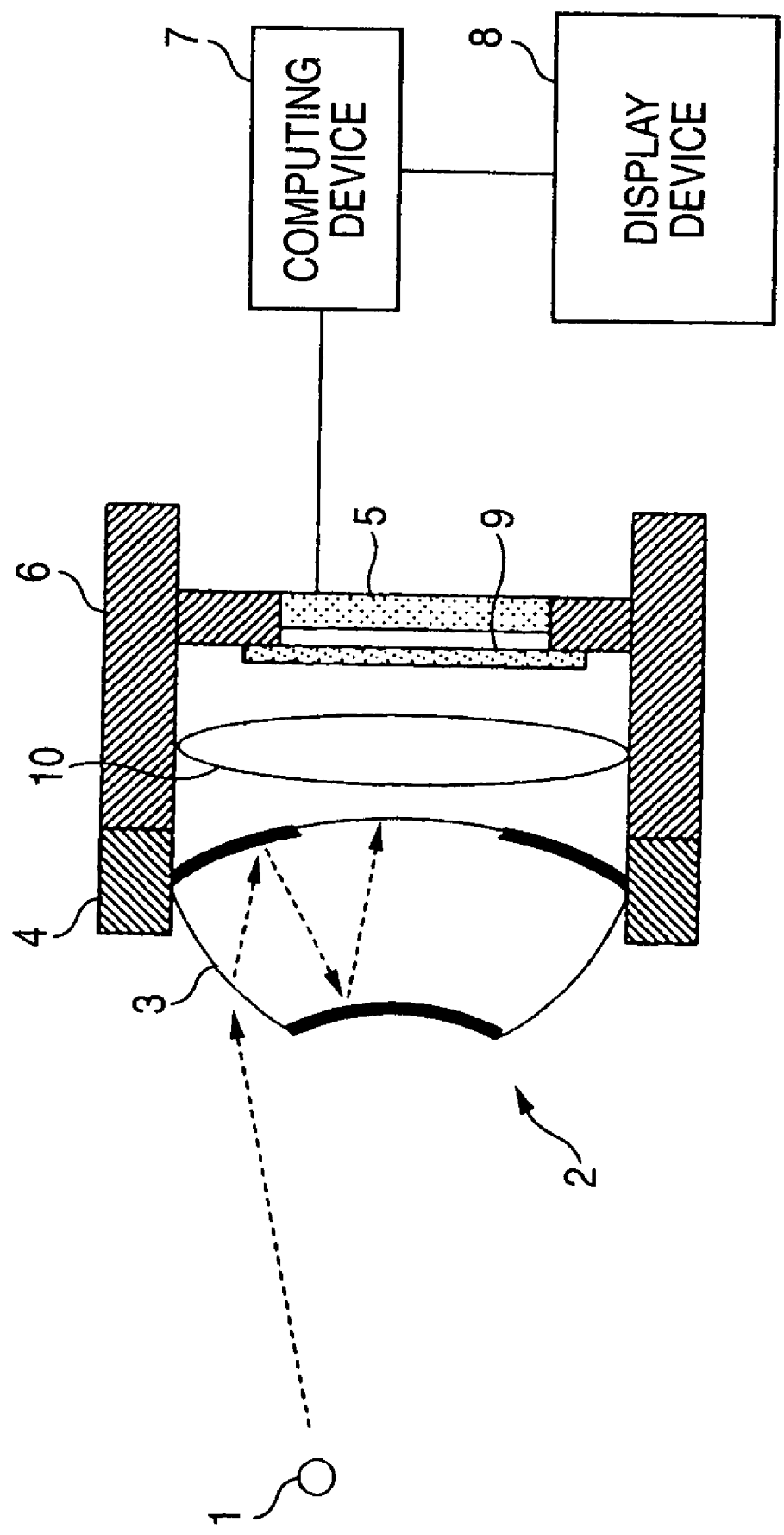
FIG. 7 is a conceptual rendering showing a second embodiment of a positional measurement system according to the present invention.

FIG. 7 is a conceptual rendering showing a second embodiment of the positional measurement system according to the present invention. Like the first embodiment, the present embodiment employs the LED light source 1, the optical lens 2 having the ring-shaped entrance window 3 and a large spherical aberration, and the image sensor 5 provided with the infrared radiation transmittance filter 9. A difference between the first embodiment and the present embodiment lies in that an imaging lens 10 is interposed between the lens 2 and the image sensor 5. Thereby, the ring image formed rearward of the lens 2 is formed on the image sensor 5. The position where the infrared radiation transmittance filter 9 is arranged is not limited to that described in connection with the present embodiment. The infrared radiation transmittance filter 9 may be disposed at another position, so long as the position is ahead of the image sensor 5.

According to the present embodiment, the necessity for arranging the image sensor 5 in the vicinity of the lens 2 is obviated as a result of arrangement of the imaging lens 10. Hence, limitations on the structure of the image sensor 5 are lessened, and various image sensors are available. As a result of selection of the type of a relay lens, the ring image can be photographed by utilization of an ordinary camera. Moreover, image sensors of various sizes can be utilized by changing the magnifying factor of the imaging lens 10. Specifically, an image sensor having a large number of pixels is also available, and the resolution at which the ring image is to be photographed can be increased, thereby enabling more accurate positional measurement.

Figure 8:
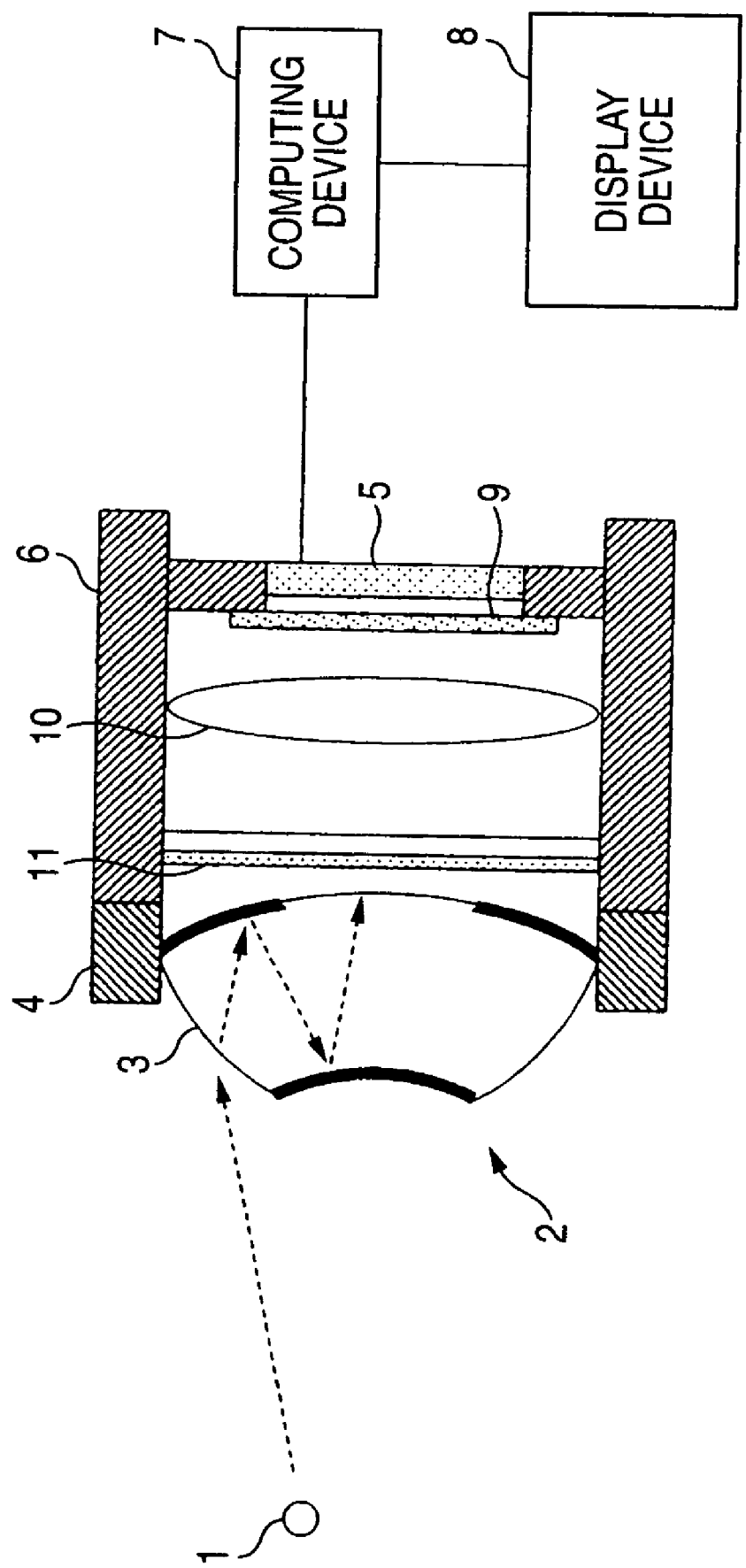
FIG. 8 is a conceptual rendering showing a modification of the second embodiment of a positional measurement system according to the present invention.

FIG. 8 is a conceptual rendering showing a modification of the second embodiment of the positional measurement system according to the present invention. As illustrated, the present embodiment is directed toward a light diffusing plate (electromagnetic wave diffusing member) 11 being disposed rearward of the lens 2 and the ring image formed on the light diffusing plate 11 being photographed by a camera disposed rearward of the lens 2. In the present modification, the camera is formed from, e.g., the imaging lens 10, the image sensor 5, the computing device 7, and the display device 8. As a result of use of the light diffusing plate 11, the number of types of the available imaging lenses 10 and the number of types of the available image sensors 5 are increased significantly. A camera equipped with an ordinary microlens can be utilized. In the case of the embodiment which is shown in FIG. 7 but not provided with the light diffusing plate 11, in many cases the light exiting from the lens 2 exits at a large angle. In order to form an image from the light on the image sensor 5 through use of the imaging lens 10, the imaging lens 10 must be formed into a lens having a large F value. In contrast, when the light diffusing plate 11 is utilized as in the case of the present modification, the light exiting from the light ring image formed on the light diffusing plate 11 spreads in all directions, and hence even a lens not having a large F value can form the ring image on the image sensor.

According to the present modification, as a result of use of the light diffusing plate, the number of types of the available imaging lenses 10 and the number of types of the available image sensors 5 are increased significantly. For this reason, the high-performance imaging lens, the image sensor, or the camera system can be utilized at low costs. The light diffusing plate (electromagnetic diffusing plate) is formed from ground glass or a white material surface and can be disposed rearward of the optical lens system. Hence, ground glass can be utilized as the diffusing surface for diffusing light rearward. The white material has high light reflectivity, and hence the receiving device can efficiently detect the shape of the ring.

Third Embodiment

Figure 9:
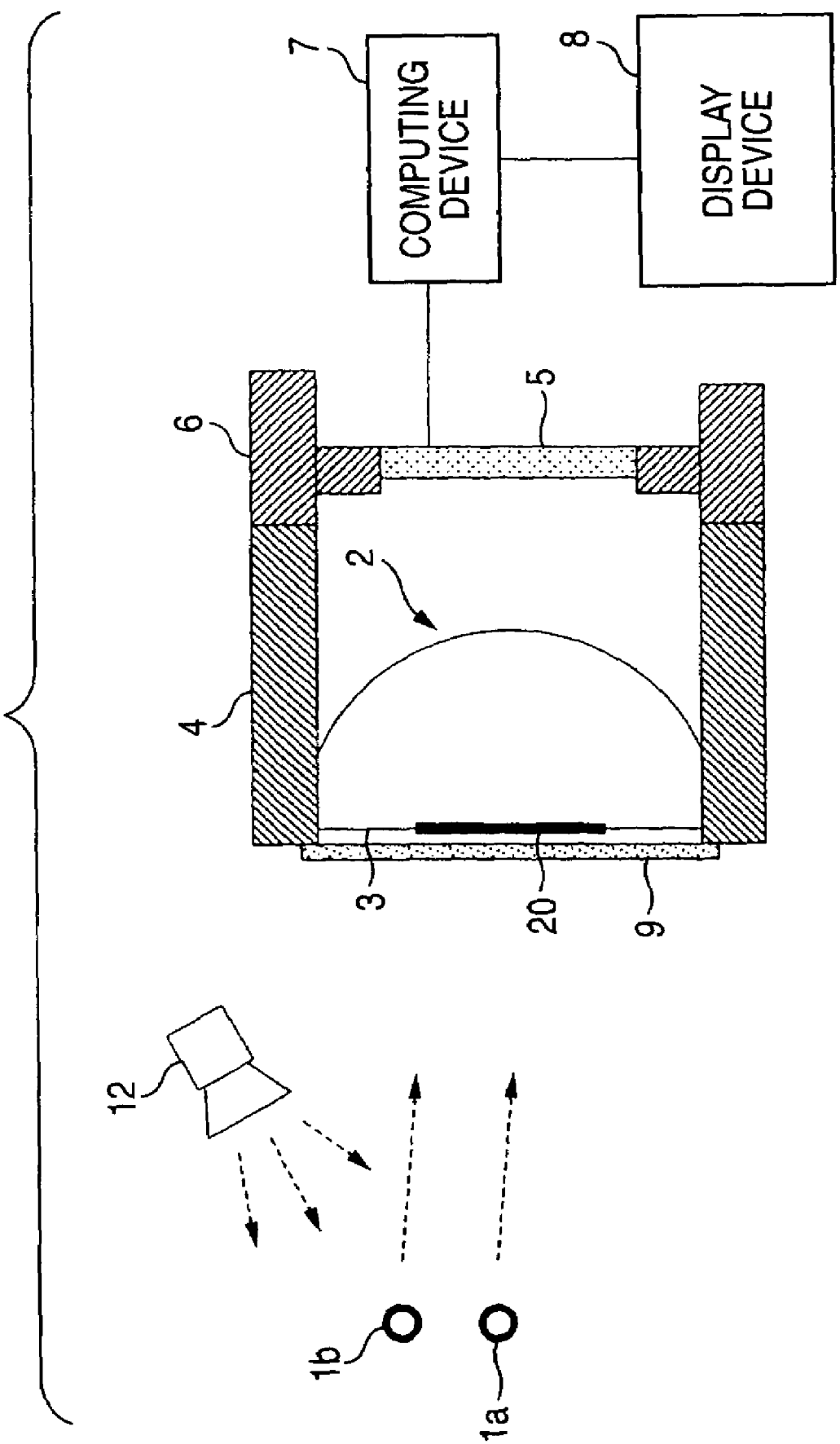
FIG. 9 is a conceptual rendering showing a third embodiment of a positional measurement system according to the present invention.

FIG. 9 is a conceptual rendering showing a third embodiment of the positional measurement system according to the present invention. The present embodiment describes an example in which three-dimensional positions of two light sources are measured simultaneously through use of a single hemispherical lens. In the present embodiment, each of two light sources (electromagnetic wave sources) 1a, 1b is formed from a metal sphere which reflects light (electromagnetic waves) originating from the radiation light source (the electromagnetic wave generator) 12. First, as illustrated, light is radiated on the metal spheres 1a, 1b, which reflect light, by use of the radiation light source 12 in the present embodiment. An LED element which generates light having a wavelength of 900 nm is used as the radiation light source 12. Since the metal spheres 1a, 1b behave as point light sources, respectively, the spheres are suitable for positional measurement of the present invention.

The light reflected by the metal spheres 1a, 1b passes through the infrared radiation transmittance filter 9 and then enters the hemispherical lens 2. The hemispherical lens 2 has a light shield section 20 disposed around the light axis of the first lens surface, and the ring-shaped entrance window 3 is disposed around the light shield section 20. The image sensor 5 is provided rearward of the lens 2, and the signal pertaining to the light ring image photographed by the image sensor 5 is subjected to arithmetic operation performed by the computing device 7, and the positional coordinates of the light source 1 computed by the computing device are displayed on the display device 8.

A hemispherical lens having a refractive index of 1.51 and a radius of curvature R of 10 mm is utilized as the hemispherical lens 2. The inner diameter of the ring-shaped entrance window 3 is determined by the light shield plate (light shield section) 20 (having an outer diameter of Φ4 mm) provided on the entrance surface of the entrance window. The outer diameter of the ring-shaped entrance window 3 is set to 6 mm.

The position of the focal point of the paraxial ray with respect to the straight line at infinity of the hemispherical lens 2 is situated 19.5 mm rearward of the exit surface of the hemispherical lens. Since the hemispherical lens has a large spherical aberration, the position where the light having entered the ring-shaped entrance window 3 (Φ4 mm to Φ6 mm) converges is considerably closer to the lens than to the focal point. Here, the image sensor 5 is disposed 5 mm rearward of the hemispherical lens 2.

Figure 10:
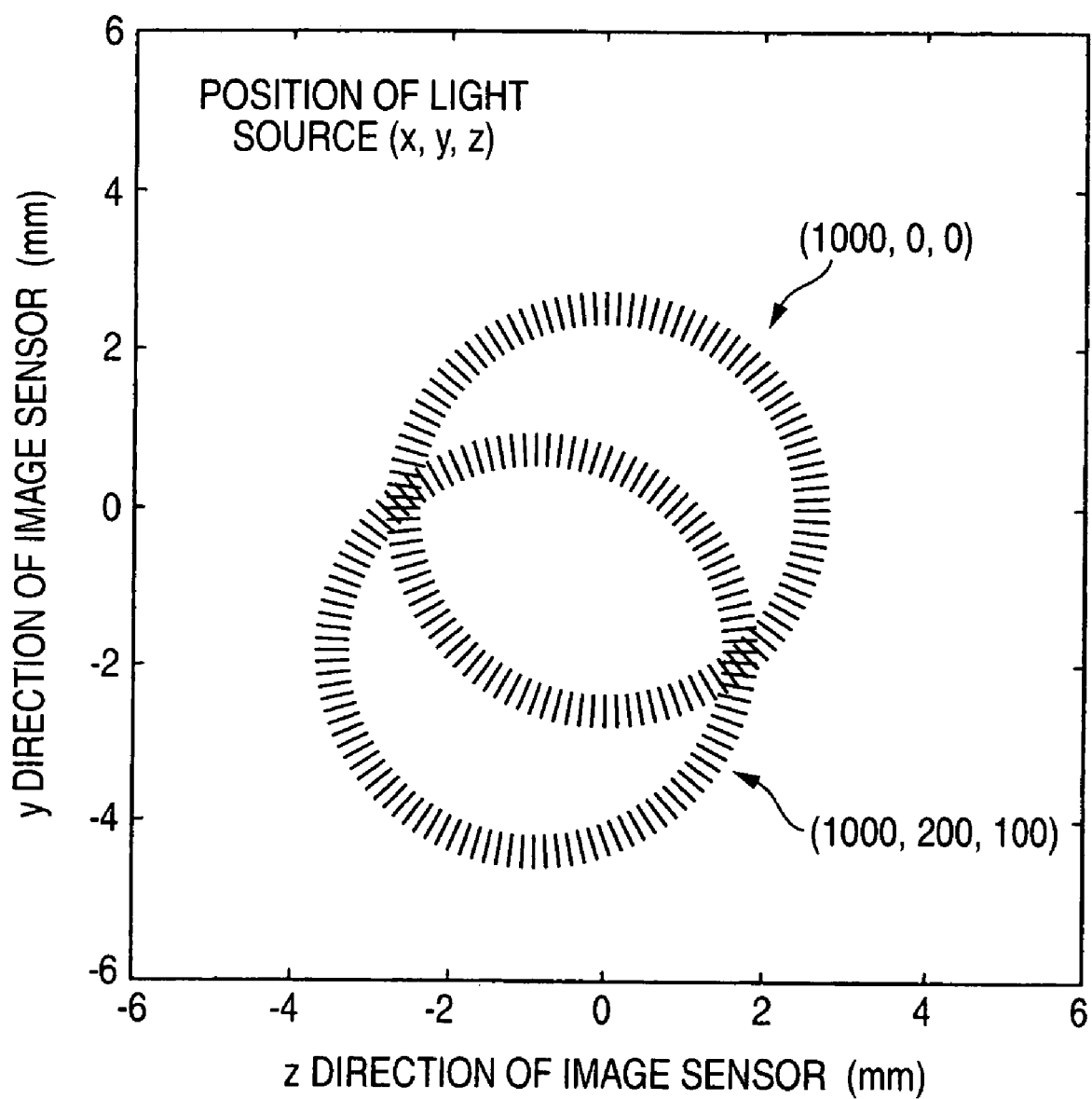
FIG. 10 is a view showing an example of the light ring image formed by two light sources shown in FIG. 9.

FIG. 10 is a view showing example light ring images formed by the two light sources shown in FIG. 9. In the drawings, the horizontal axis represents the "z" direction (mm) of the image sensor, and the vertical axis represents the "y" direction (mm) of the image sensor. In the embodiment, one metal sphere (light source) 1a is located at positional coordinates (1000, 0, 0), and the other metal sphere (light source) 1b is located at positional coordinates (1000, 200, 100). As shown in FIG. 10, in the present embodiment the two light ring images overlap each other. However, the ring images are narrow and hollow, and hence the images can be readily discerned. The three-dimensional positions of the respective metal spheres (light sources) 1a, 1b can be determined from the outer diameters and centers of the respective ring images.

According to the present embodiment, the ring-shaped entrance window is provided on the lens system, and hence plural light sources can be readily measured simultaneously. In the present embodiment, the electromagnetic wave generator is not the object of positional measurement, and a small reflection member which reflects electromagnetic waves can be taken as an object of positional measurement. Therefore, this small reflection member is affixed to an object, so that three-dimensional positions of various objects can be measured readily.

Fourth Embodiment

Figure 11:
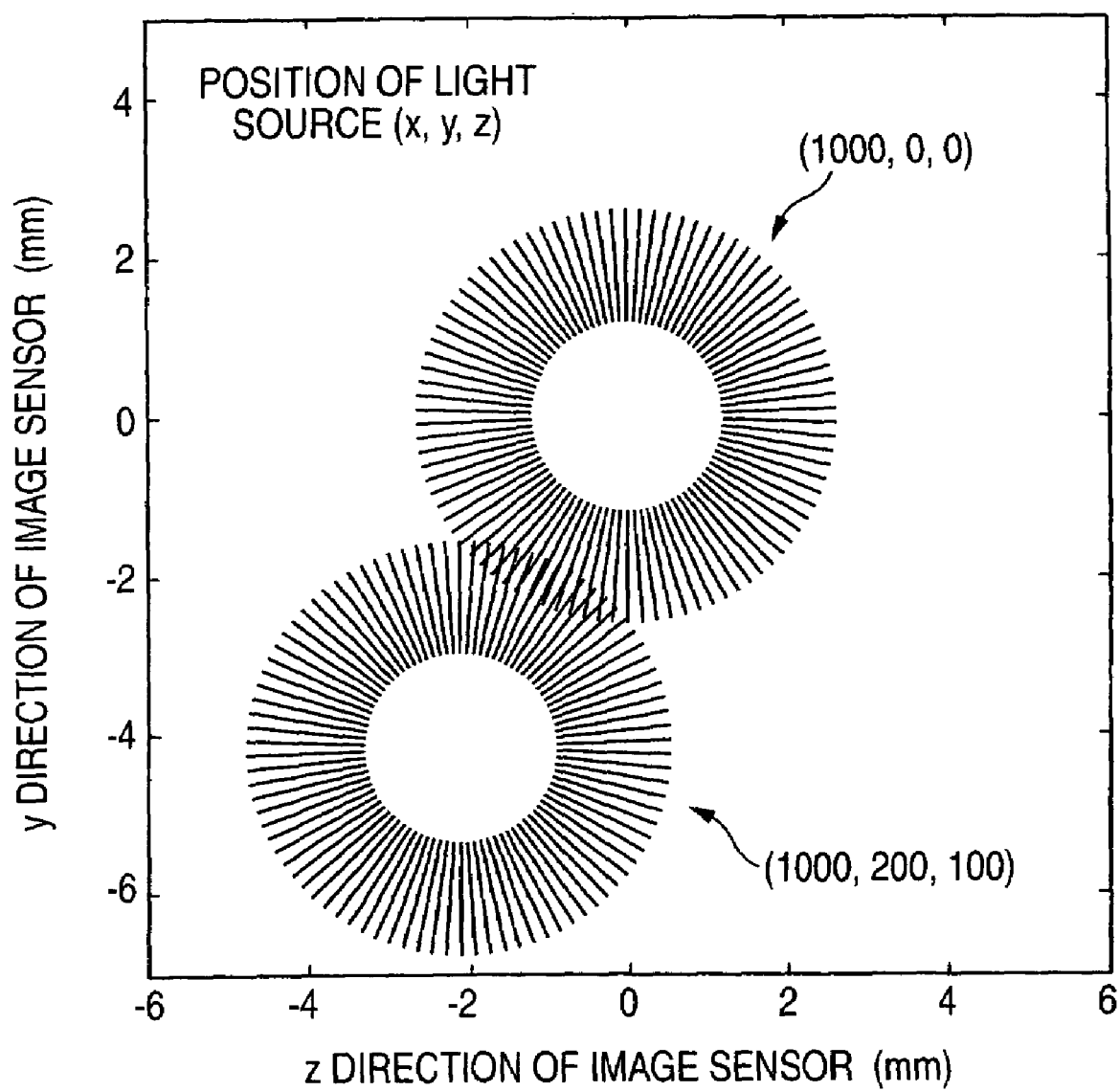
FIG. 11 is a view showing another example of the light ring image for describing a fourth embodiment of the positional measurement system according to the present invention.

FIG. 11 is a conceptual rendering showing a fourth embodiment of the positional measurement system according to the present invention. The present embodiment is substantially identical in configuration with the third embodiment and hence is omitted from drawings. A difference between the third and fourth embodiments lies in that the image sensor 5 in FIG. 9 is at a position to the rear of the focal point of the paraxial ray of the lens 2. The focal point of the paraxial ray of the lens 2 is situated 19.5 mm rearward of the exit surface of the lens 2. In the present embodiment, the image sensor 5 is disposed 21 mm rearward of the exit surface of the lens 2, more specifically, 1.5 mm rearward of the focal point. In this case, the ring image formed by the image sensor 5 is as shown in FIG. 11. Here, the one metal sphere (light source) 1a is located at positional coordinates (1000, 0, 0), and the other metal sphere (light source) 1b is located at positional coordinates (1000, 200, 100). The respective ring images of the present embodiment do not involve overlaps stemming from return of light, and hence the outermost peripheries of the ring images do not have high light intensity. However, the three-dimensional positions of the respective metal spheres (light sources) 1a, 1b can be determined by measuring the outer and inner diameters and centers of the respective ring images.

According to the present embodiment, the ring-shaped entrance window is provided on the front surface of the lens system, so that the degree of freedom of the layout of the image sensor is increased, thereby enabling three-dimensional positional measurement in a more simple manner.

Fifth Embodiment

Figure 12A:
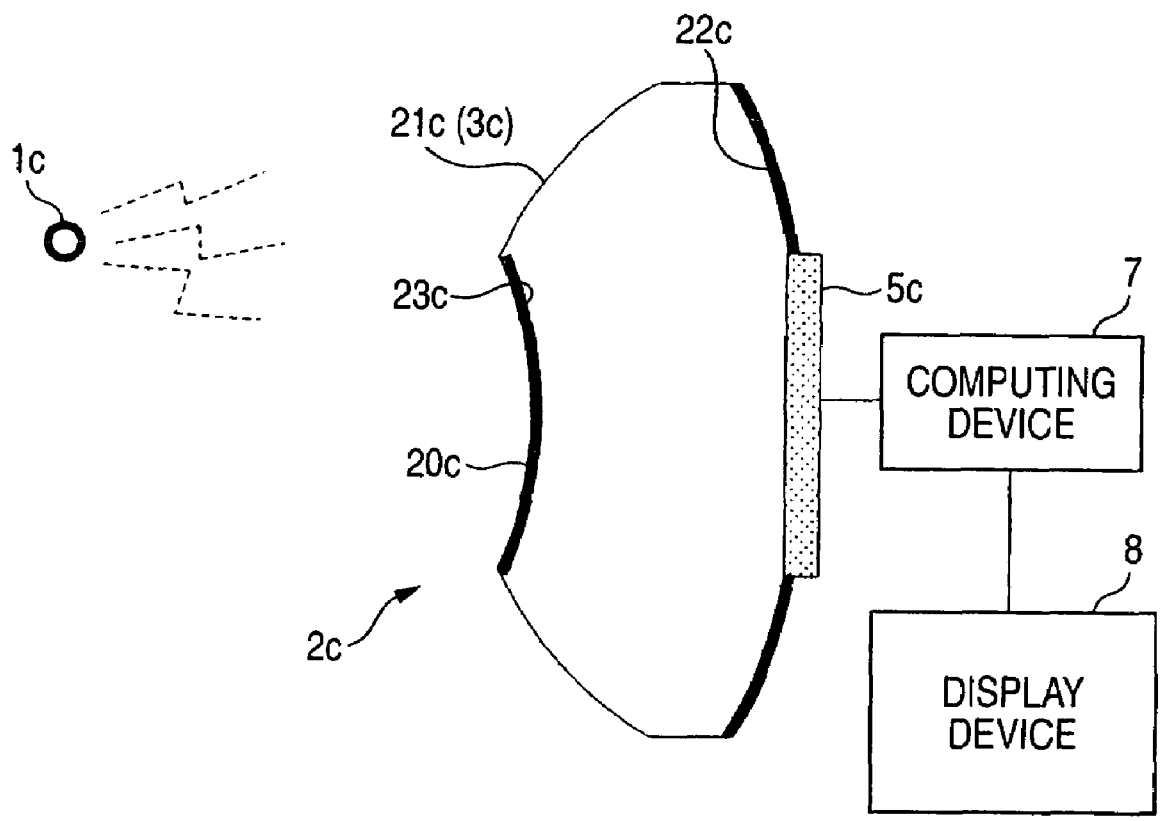
FIG. 12A is a conceptual rendering showing a fifth embodiment of the positional measurement system according to the present invention.
Figure 12B:
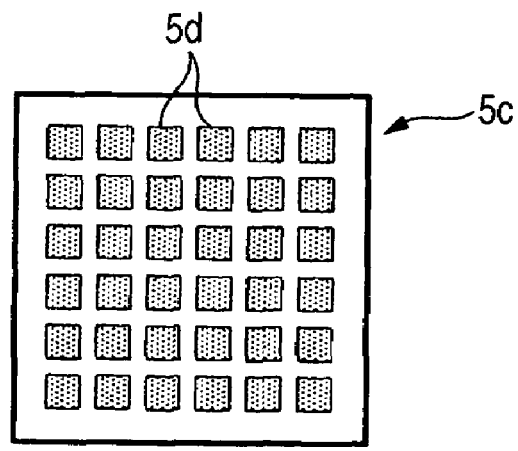
FIG. 12B is a conceptual rendering of an antenna array.

FIG. 12A is a conceptual rendering showing a fifth embodiment of the positional measurement system according to the present invention, and FIG. 12B is a conceptual rendering of an antenna array. The present embodiment shows an example in which millimeter radio waves are used as electromagnetic waves and in which an antenna array is used as a receiver for the radio waves. As illustrated, the present embodiment comprises a radio wave source (transmitter) 1c which emits millimeter radio waves having a frequency of, e.g., 60 GHz, a lens antenna 2c having a toroidal (ring-shaped) entrance window 3c into which millimeter radio waves emitted from the radio wave source 1c enter, an antenna array 5c disposed rearward of the lens antenna 2c, the computing device 7 for arithmetically processing a signal of a ring (radio wave ring) of the electromagnetic waves received by the antenna array 5, and the display device 8 for displaying positional coordinates of the radio wave source 1c computed by the computing device 7.

As illustrated, the lens antenna 2c has an electromagnetic wave shield section (radio wave shield section) 20c disposed around the center axis of the first lens surface, and a radio wave ring to serve as a radio wave concentrated area is formed at a position opposite the radio wave source, by the radio waves having entered the lens antenna by way of a first lens surface 21c exclusive of the radio wave shield section 20c (the ring-shaped entrance window 3c). Therefore, a first mirror surface 22c is disposed at a position spaced from the center axis of the second lens surface opposing the first lens surface 21. A second surface 23c is disposed at the position of the radio wave shield section 20c. In the embodiment, the surface of the lens antenna 2c opposing the second mirror surface 23c is provided with the antenna array 5c.

The lens antenna 2c is formed from, e.g., a dielectric. For instance, Teflon™ (having a refracting index of 1.35) is used as a material of the dielectric. Reflection mirrors (the first and second mirror surfaces) 22c, 23c to be provided on the lens antenna 2c are formed from, e.g., aluminum. The radio wave ring is detected by the antenna array 5c disposed on the rear surface of the lens antenna 2c. As shown in FIG. 12B, an antenna array into which plane antennas 5d are two-dimensionally arranged can be utilized as the antenna array 5c. In the embodiment, the plane antenna 5d is structured as being embedded in Teflon, which is the material of the lens antenna 2c. When the wavelength of radio waves is taken as $\lambda$, The plane antenna 5d is arranged at a pitch of $\lambda$ or more, preferably a pitch of $2\lambda$ or more. Thereby, the respective antennas can easily detect independent radio waves. As a result of the antenna array 5c being embedded in the dielectric of the lens antenna 2c, the wavelength $\lambda$ is reduced to the reciprocal of the refractive index of the antenna array. Hence, the arrangement pitch of the plane antennas 5d can be reduced, thereby enabling miniaturization of the antenna array 5c. In the case of the present embodiment, the wavelength of the radio waves is 5 mm/1.35, that is, about 3.7 mm. As in the case of the embodiments described thus far, the three-dimensional position of the millimeter radio wave source (radio wave source) 1c can be determined from the position and size of the radio wave ring.

According to the present embodiment, the millimeter waves pass through an object at a transmissivity which is higher than transmissivity at which light passes through the object. Hence, even when a person or an object is present between the object of measurement and the lens system, three-dimensional positional measurement can be performed. The size of the antenna array can be reduced by embedding the radio wave antenna array into the lens antenna. The present embodiment utilizes millimeter waves (having a wavelength of 1 mm to 1 cm) as radio waves. Positional measurement can be performed in the same manner even in the case of microwaves having a wavelength (a wavelength of 1 cm to 10 cm) longer than that of the millimeter waves or ultra-short waves (a wavelength of 10 cm to 1 m). The present embodiment employs a lens having two mirrors provided on the first and second surfaces thereof, respectively. However, in the case of the lens system shown in FIG. 9, positional measurement can be performed in a similar manner.

Sixth Embodiment

Figure 13:
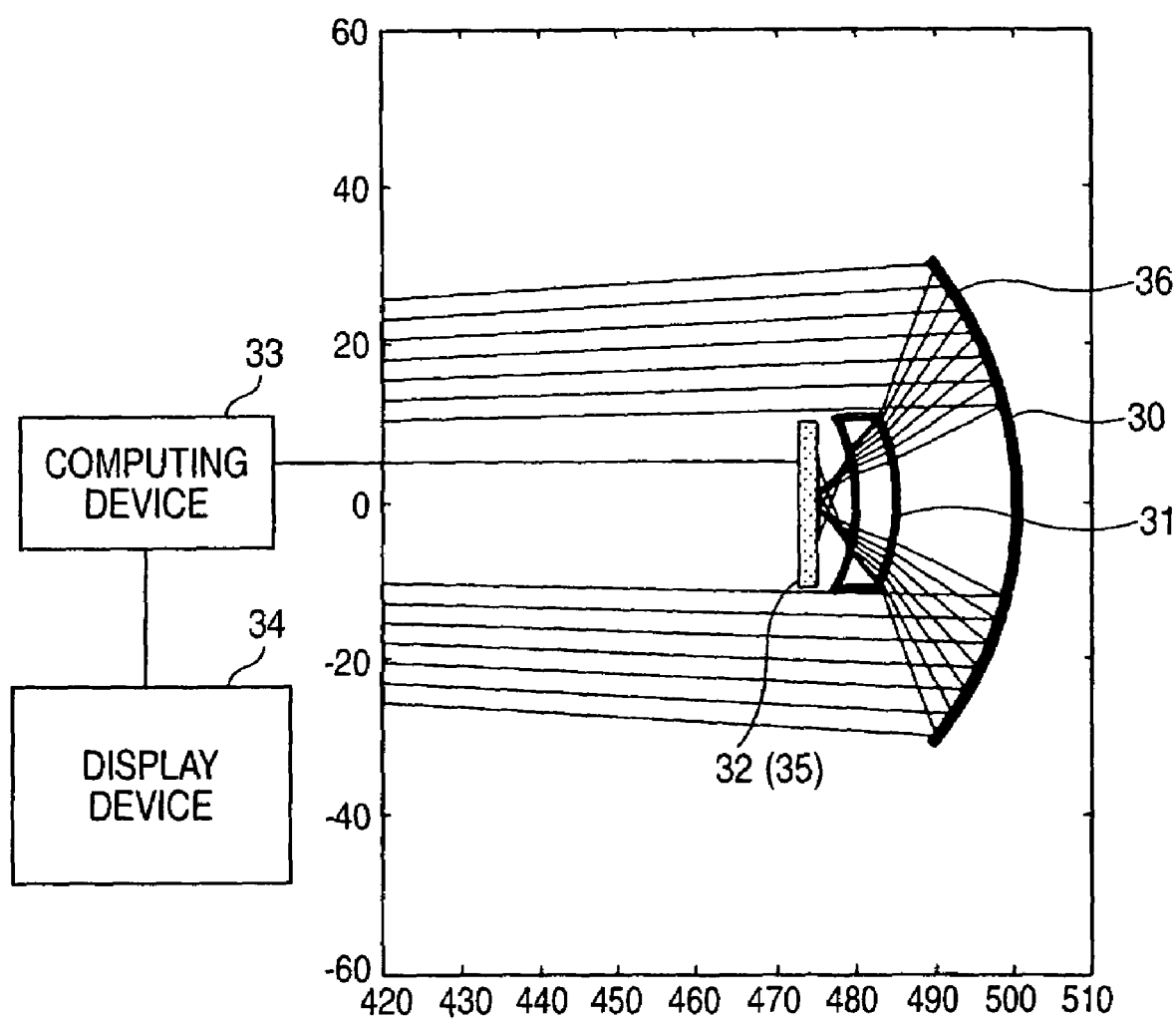
FIG. 13 is a conceptual rendering showing a sixth embodiment of the positional measurement system of the present invention.

FIG. 13 is a conceptual rendering showing a sixth embodiment of the positional measurement system according to the present invention. The present embodiment comprises an LED light source (not shown) which emits light (infrared radiation) having a wavelength of, e.g., 900 nm, a concave mirror 30 which forms a light concentrated area (electromagnetic wave concentrated area) by reflecting the light emitted from the LED light source, a lens 31 which is an optical component which is interposed between the LED light source and the mirror and imparts a change in the traveling direction of the light, an image sensor 32 for detecting the light concentrated area formed by the mirror 30, a computing device 33 which measures the position of the light source on the basis of information about the light concentrated area detected by the image sensor, and a display device 34 for displaying positional coordinates of the light source computed by the computing device. The image sensor 32 can be constituted of, e.g., a CCD.

As illustrated, the image sensor 32 is disposed at a position close to the mirror 30. Thereby, the light traveling toward the mirror 30 from the light source is blocked by the image sensor 32. Specifically, the image sensor 32 plays the role of a light shield section 35. The outer diameter of the lens 31 is substantially equal to that of the image sensor 32 (the light shield section 35). Thus, a light entrance window 36 by way of which the light arrives at the mirror 30 is formed at a position distant from the optical axis. Even in the case of the present embodiment, the light concentrated area (light ring image), such as that shown in FIGS. 3 to 5 which have been described previously, is obtained in accordance with various requirements.

In the present embodiment, the distance from the light source to the mirror 30 along the optical axis is 500 mm, the outer diameter of the entrance window 36 is 30 mm, the outer diameter of the light shield section 35 is 10 mm, the curvature radius of the mirror 30 is −50 mm, the distance from the mirror 30 to the lens 31 along the optical axis is 15 mm, the refracting index of the lens 31 is 1.51, the curvature radius of a first surface of the lens 31 is 35 mm, the curvature radius of a second surface of the lens 31 is −20 mm, the thickness of the lens 31 along the optical axis is 5 mm, and the distance from the image sensor 32 to the lens 31 along the optical axis is 5 mm.

Thus, in the present embodiment, the light emitted from the LED light source is reflected by the mirror 30 having a large spherical aberration, and the lens 31 gathers the thus-reflected light to thereby form a ring-shaped band of light (the light ring image) which is the light concentrated area. This light ring image is detected by the image sensor 32. A resultant detection signal is computed by the computing device 33, to thus measure the position of the light source. Here, the ring shape encompasses the shape of an entire ring, the shape of a part of a ring, and shapes of various modifications of a ring.

Seventh Embodiment

Figure 14:
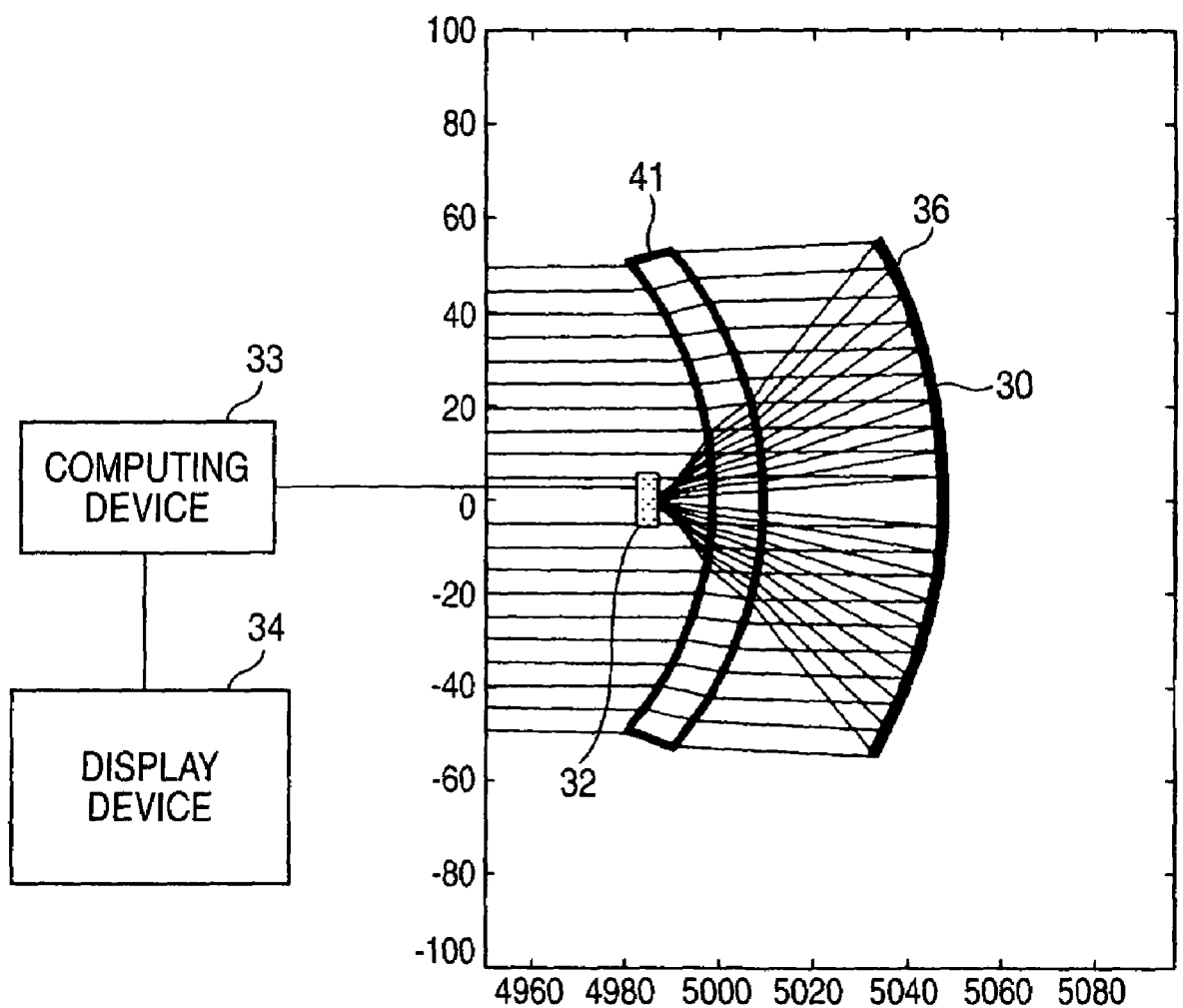
FIG. 14 is a conceptual rendering showing a seventh embodiment of the positional measurement system of the present invention.

FIG. 14 is a conceptual rendering showing a seventh embodiment of the positional measurement system according to the present invention. Here, explanations of those portions of the present embodiment which are identical with those of the sixth embodiment are omitted. A difference between the present embodiment and the sixth embodiment lies in that a lens 41 having a large outer diameter is provided. The course of the light that has been emitted from the light source and travels toward the mirror 30 is changed to the direction of divergence. As a result, the light is transmitted to and reflected by the entrance window 36 of the mirror 30 having a large spherical aberration.

In the present embodiment, the distance from the light source to the lens 41 along the optical axis is 5000 mm, the outer diameter of the entrance window 36 is 50 mm, the refracting index of the lens 41 is 1.51, the curvature radius of a first surface of the lens 41 is −73 mm, the curvature radius of a second surface of the lens 41 is 83 mm, the thickness of the lens 41 along the optical axis is 10 mm, the distance from the mirror 30 to the lens 41 along the optical axis is 37 mm, the curvature radius of the mirror 30 is −120 mm, and the distance from the image sensor 32 to the lens 41 along the optical axis is 13 mm.

Thus, in the present embodiment, the light emitted from the LED light source is reflected by the mirror 30 having a large spherical aberration, and the lens 41 gathers the thus-reflected light to thereby form the light ring image which is the light concentrated area. This light ring image is detected by the image sensor 32. The detection signal is then subjected to the processing performed by the processing device 33, whereby the position of the light source is computed.

Figure 15:
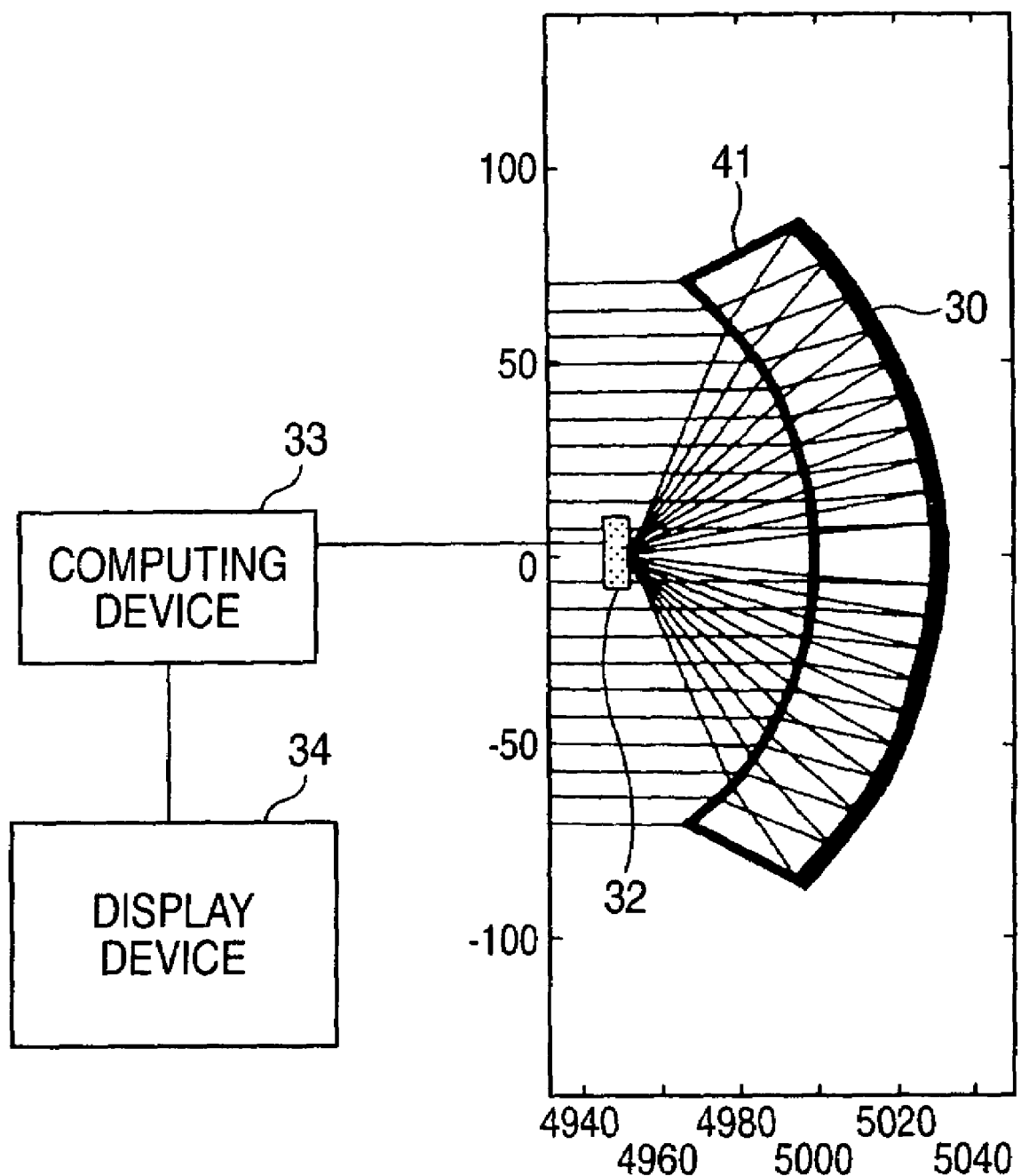
FIG. 15 is a conceptual rendering showing a first modification of the seventh embodiment of the positional measurement system of the present invention.

FIG. 15 is a conceptual rendering showing a first modification of the seventh embodiment of the positional measurement system according to the present invention. Here, explanations of those portions of the present embodiment which are identical with those of the sixth and seventh embodiments are omitted. A difference between the present embodiment and the seventh embodiment lies in that the lens 41 is brought into intimate contact with the mirror 30. This is effective for simplifying alignment of individual sections and miniaturizing the system.

In the present modification, the distance from the light source to the lens 41 along the optical axis is 5000 mm, the outer diameter of the entrance window 36 is 70 mm, the refracting index of the lens 41 is 1.82, the curvature radius of the first surface of the lens 41 is −90 mm, the curvature radius of the second surface of the lens 41 is 120 mm, the thickness of the lens 41 along the optical axis is 30 mm, the distance from the mirror 30 to the lens 41 along the optical axis is 0 mm, the curvature radius of the mirror 30 is −120 mm, and the distance from the image sensor 32 to the lens 41 along the optical axis is 49 mm.

Thus, in the present embodiment, the light emitted from the LED light source is reflected by the mirror 30 having a large spherical aberration, and the lens 41 gathers the thus-reflected light to thereby form the light ring image, which is the light concentrated area. This light ring image is detected by the image sensor 32. The detection signal is then subjected to the processing performed by the processing device 33.

Figure 16:
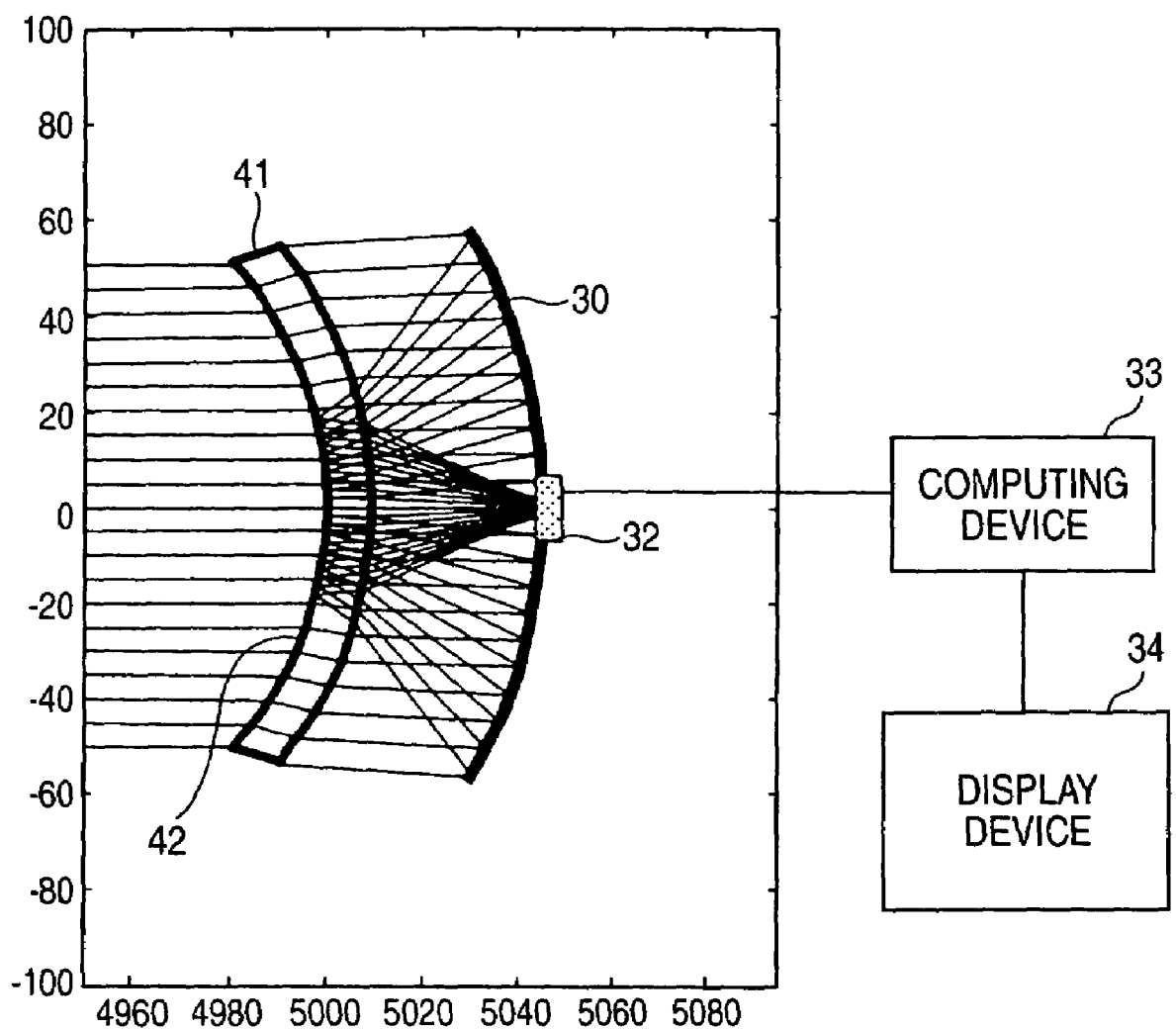
FIG. 16 is a conceptual rendering showing a second modification of the seventh embodiment of the positional measurement system of the present invention.

FIG. 16 is a conceptual rendering showing a second modification of the seventh embodiment of the positional measurement system according to the present invention. Here, explanations of those portions of the present embodiment which are identical with those of the sixth and seventh embodiments are omitted. A difference between the present embodiment and the seventh embodiment lies in that a half mirror 42 is disposed at a position close to the light source of the lens 41. Therefore, the area of the mirror 30 around the optical axis is eliminated, and the image sensor 32 is provided at this position. The light reflected by the half mirror 42 forms the light concentrated area, which is detected by the image sensor 32.

In the present modification, the distance from the light source to the lens 41 along the optical axis is 5000 mm, the outer diameter of the entrance window 36 is 50 mm, the refracting index of the lens 41 is 1.82, the curvature radius of the first surface of the lens 41 is −75 mm, the curvature radius of the second surface of the lens 41 is 85 mm, the thickness of the lens 41 along the optical axis is 10 mm, the distance from the mirror 30 to the lens 41 along the optical axis is 35 mm, the curvature radius of the mirror 30 is −120 mm, and the distance from the image sensor 32 to the mirror 30 along the optical axis is 0 mm.

Thus, in the present embodiment, the light emitted from the LED light source is reflected by the mirror 30 having a large spherical aberration, and the lens 41 gathers the thus-reflected light to thereby form the light ring image, which is the light concentrated area. This light ring image is detected by the image sensor 32. The detection signal is then subjected to the processing performed by the processing device 33, whereby the position of the light source is computed.

Figure 17:
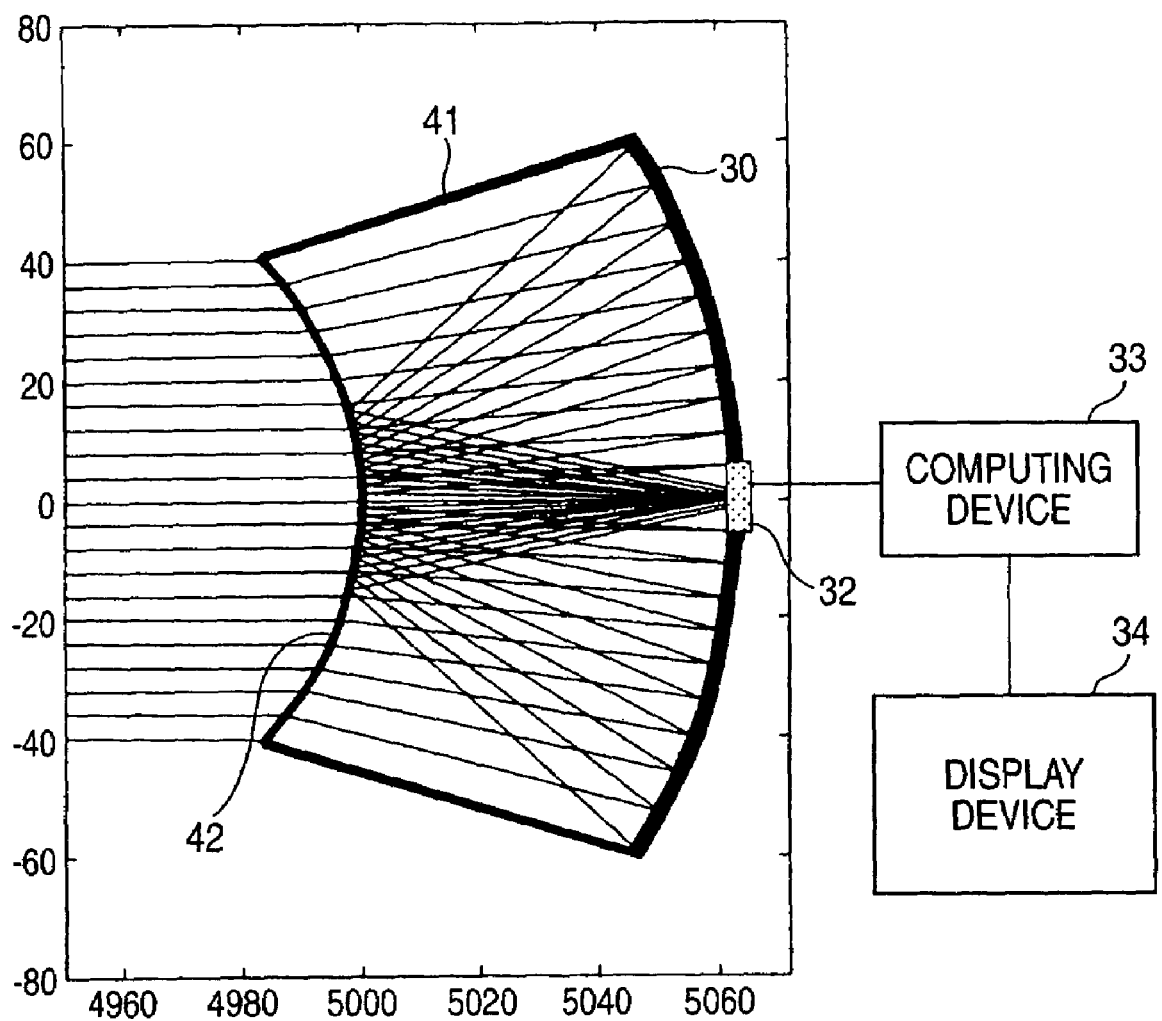
FIG. 17 is a conceptual rendering showing a third modification of the seventh embodiment of the positional measurement system of the present invention.

FIG. 17 is a conceptual rendering showing a third modification of the seventh embodiment of the positional measurement system according to the present invention. Here, explanations of those portions of the present embodiment which are identical with those of the sixth and seventh embodiments and those of the second modification are omitted. A difference between the present embodiment and the seventh embodiment lies in that the lens 41 is brought into intimate contact with the mirror 30 and in that the half mirror 42 is disposed at a position close to the light source of the lens 41. Therefore, the area of the mirror 30 around the optical axis is eliminated, and the image sensor 32 is provided at this position. The light reflected by the half mirror 42 forms the light concentrated area, which is detected by the image sensor 32. This is effective for simplifying alignment of individual sections and miniaturizing the system.

In the present modification, the distance from the light source to the lens 41 along the optical axis is 5000 mm, the outer diameter of the entrance window 36 is 40 mm, the refracting index of the lens 41 is 1.51, the curvature radius of the first surface of the lens 41 is −58 mm, the curvature radius of the second surface of the lens 41 is 120 mm, the thickness of the lens 41 along the optical axis is 62 mm, the distance from the mirror 30 to the lens 41 along the optical axis is 0 mm, the curvature radius of the mirror 30 is −120 mm, and the distance from the image sensor 32 to the lens 41 (or the mirror 30) along the optical axis is 0 mm.

Thus, in the present embodiment, the light emitted from the LED light source is reflected by the mirror 30 having a large spherical aberration, and the lens 41 gathers the thus-reflected light to thereby form the light ring image, which is the light concentrated area. This light ring image is detected by the image sensor 32. The detection signal is then subjected to the processing performed by the processing device 33, whereby the position of the light source is computed.

Eighth Embodiment

Figure 18:
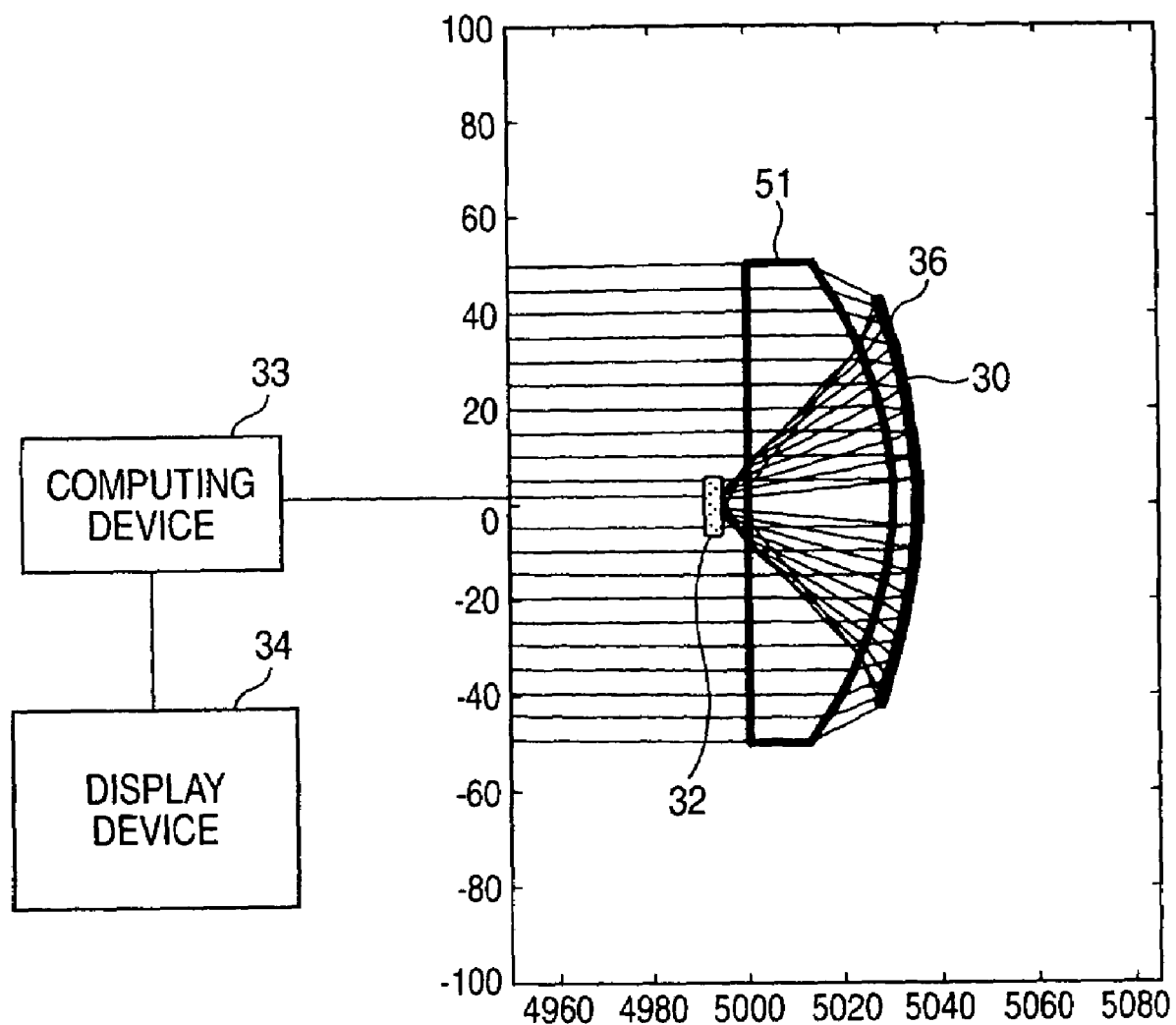
FIG. 18 is a conceptual rendering showing an eighth embodiment of the positional measurement system of the present invention.

FIG. 18 is a conceptual rendering showing an eighth embodiment of the positional measurement system according to the present invention. Here, explanations of those portions of the present embodiment which are identical with those of the sixth embodiment are omitted. A difference between the present embodiment and the sixth embodiment lies in provision of a plano-convex lens 51 having a large surface provided on a side of the lens facing the light source and having a large outer diameter. The course of the light that has been emitted from the light source and travels toward the mirror 30 is changed to the direction of divergence. As a result, the light is transmitted to and reflected by the entrance window 36 of the mirror 30 having a large spherical aberration.

In the present embodiment, the distance from the light source to the lens 51 along the optical axis is 5000 mm, the outer diameter of the entrance window 36 is 50 mm, the refracting index of the lens 51 is 1.51, the first surface of the lens 51 is flat, the curvature radius of the second surface of the lens 51 is 83 mm, the thickness of the lens 51 along the optical axis is 30 mm, the distance from the mirror 30 to the lens 51 along the optical axis is 5 mm, the curvature radius of the mirror 30 is −120 mm, and the distance from the image sensor 32 to the lens 51 along the optical axis is 5 mm.

Thus, in the present embodiment, the light emitted from the LED light source is reflected by the mirror 30 having a large spherical aberration, and the lens 51 gathers the thus-reflected light to thereby form the light ring image, which is the light concentrated area. This light ring image is detected by the image sensor 32. The detection signal is then subjected to the processing performed by the processing device 33, whereby the position of the light source is computed.

Figure 19:
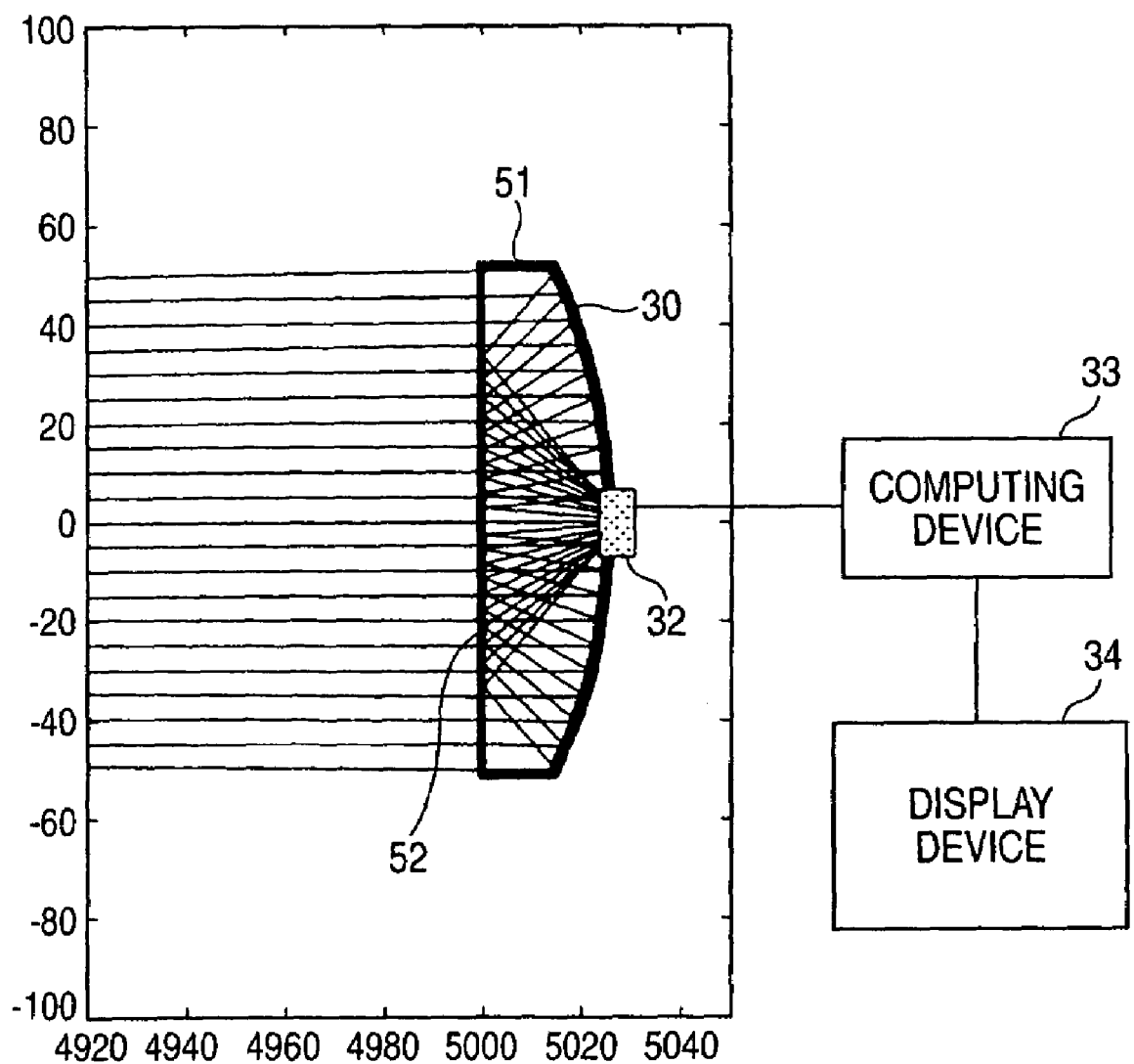
FIG. 19 is a conceptual rendering showing a first modification of the eighth embodiment of the positional measurement system of the present invention.

FIG. 19 is a conceptual rendering showing a first modification of the eighth embodiment of the positional measurement system according to the present invention. Here, explanations of those portions of the present embodiment which are identical with those of the sixth and eighth embodiments are omitted. A difference between the present embodiment and the eighth embodiment lies in that the lens 51 is brought into intimate contact with the mirror 30 and that a half mirror 52 is provided on the flat surface of the lens 51 facing the light source. Therefore, the area of the mirror 30 around the optical axis is eliminated, and the image sensor 32 is provided at this position. The light reflected by the half mirror 42 forms the light concentrated area, which is detected by the image sensor 32.

In the present modification, the distance from the light source to the lens 41 along the optical axis is 5000 mm, the outer diameter of the entrance window 36 is 50 mm, the refracting index of the lens 51 is 1.82, the first surface of the lens 51 is flat, the curvature radius of the second surface of the lens 51 is 120 mm, the thickness of the lens 51 along the optical axis is 26 mm, the distance from the mirror 30 to the lens 51 along the optical axis is 0 mm, the curvature radius of the mirror 30 is −120 mm, and the distance from the image sensor 32 to the lens 41 along the optical axis is 0 mm.

Thus, in the present embodiment, the light emitted from the LED light source is reflected by the mirror 30 having a large spherical aberration, the lens 51 gathers the thus-reflected light, and the thus-gathered light is reflected by the half mirror 52, to thereby form the light ring image, which is the light concentrated area. This light ring image is detected by the image sensor 32. The detection signal is then subjected to the processing performed by the processing device 33.

Figure 20:
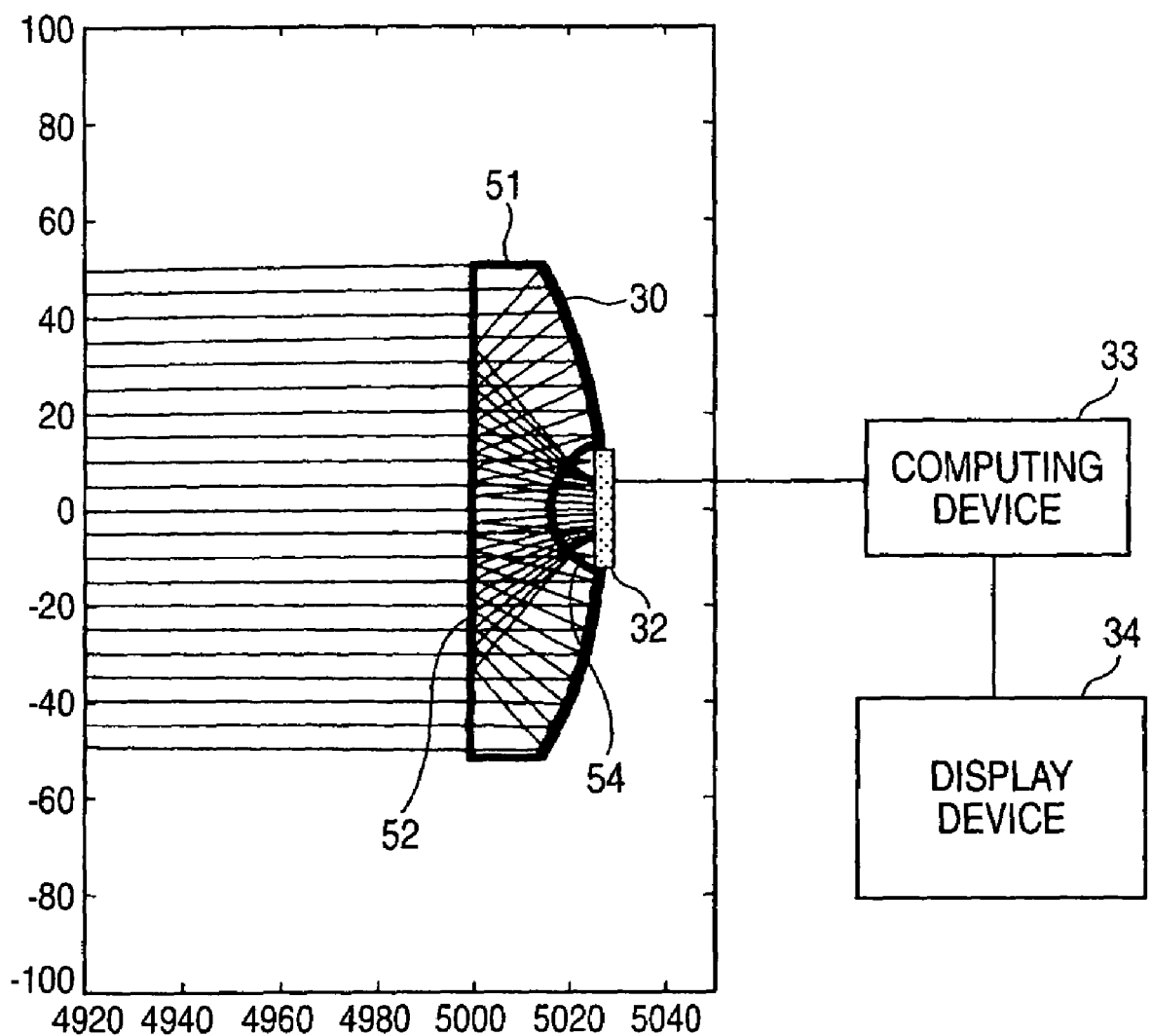
FIG. 20 is a conceptual rendering showing a second modification of the eighth embodiment of the positional measurement system of the present invention.

FIG. 20 is a conceptual rendering showing a second modification of the eighth embodiment of the positional measurement system according to the present invention. Here, explanations of those portions of the present embodiment which are identical with those of the sixth and eighth embodiments and those of the first modification are omitted. A difference between the present embodiment and the first modification lies in that a concave lens surface 54 of the lens 51 is exposed in the area of the mirror 30 which is close to the optical axis and has been eliminated. The image sensor 32 is disposed so as to oppose this area. The light reflected by the half mirror 52 forms the light concentrated area by way of the lens surface 54, and the thus-formed light concentrated area is detected by the image sensor 32.

In the present modification, the distance from the light source to the lens 41 along the optical axis is 5000 mm, the outer diameter of the entrance window 36 is 50 mm, the refracting index of the lens 51 is 1.82, the first surface of the lens 51 is flat, the curvature radius of the second surface of the lens 51 is 120 mm, the thickness of the lens 51 along the optical axis is 16 mm, the distance from the mirror 30 to the lens 51 along the optical axis is 0 mm, the curvature radius of the mirror 30 is −120 mm, the curvature radius of the lens surface 54 is 10 mm, and the distance from the image sensor 32 to the lens 51 along the optical axis is 10 mm.

Thus, in the present embodiment, the light emitted from the LED light source is reflected by the mirror 30 having a large spherical aberration, the lens 51 gathers the thus-reflected light, and the thus-gathered light is reflected by the half mirror 52, to thereby form the light ring image, which is the light concentrated area. This light ring image is detected by the image sensor 32. The detection signal is then subjected to the processing performed by the processing device 33, whereby the position of the light source is computed.

Figure 21:
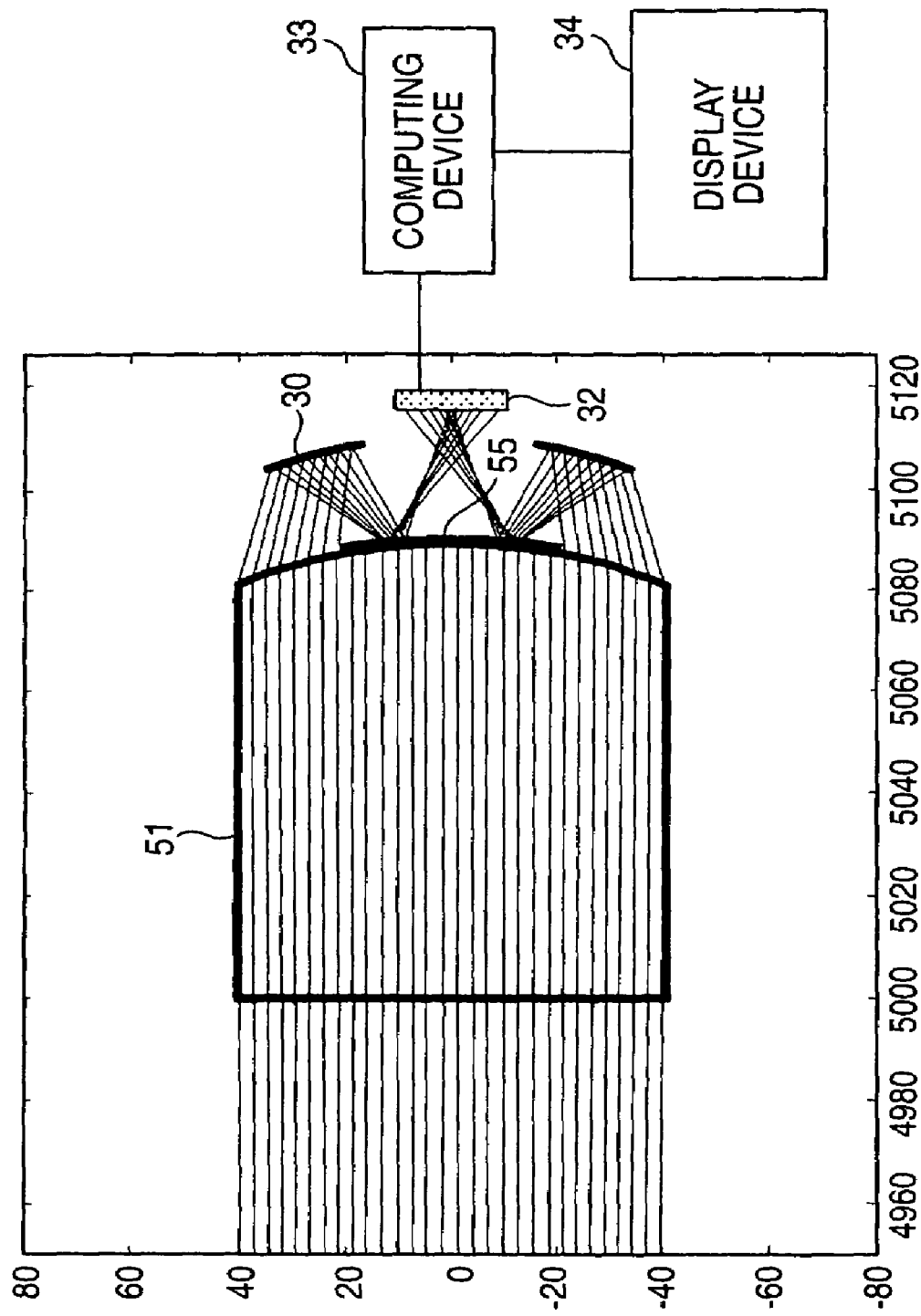
FIG. 21 is a conceptual rendering showing a third modification of the eighth embodiment of the positional measurement system of the present invention.

FIG. 21 is a conceptual rendering showing a third modification of the eighth embodiment of the positional measurement system according to the present invention. Here, explanations of those portions of the present embodiment which are identical with those of the sixth and eighth embodiments are omitted. A difference between the present embodiment and the eighth embodiment lies in that a convex mirror 55 is provided on the lens surface of the lens 51 facing the mirror 30. Therefore, the area of the mirror 30 around the optical axis is eliminated, and the image sensor 32 is provided at a position in the extension of this area. The light reflected by the mirror 55 forms the light concentrated area, which is detected by the image sensor 32.

In the present modification, the distance from the light source to the lens 41 along the optical axis is 5000 mm, the outer diameter of the entrance window 36 is 40 mm, the refracting index of the lens 51 is 1.51, the first surface of the lens 51 is flat, the curvature radius of the second surface of the lens 51 is 90 mm, the thickness of the lens 51 along the optical axis is 90 mm, the distance from the mirror 30 to the lens 51 along the optical axis is 20 mm, the curvature radius of the mirror 30 is −100 mm, and the distance from the image sensor 32 to the lens 51 along the optical axis is 26 mm.

Thus, in the present embodiment, the light emitted from the LED light source is reflected by the mirror 30 having a large spherical aberration, and the mirror 55 provided on the lens 51 reflects the thus-reflected light, to thus form the light ring image, which is the light concentrated area. This light ring image is detected by the image sensor 32. The detection signal is then subjected to the processing performed by the processing device 33, whereby the position of the light source is computed.

Ninth Embodiment

Figure 22:
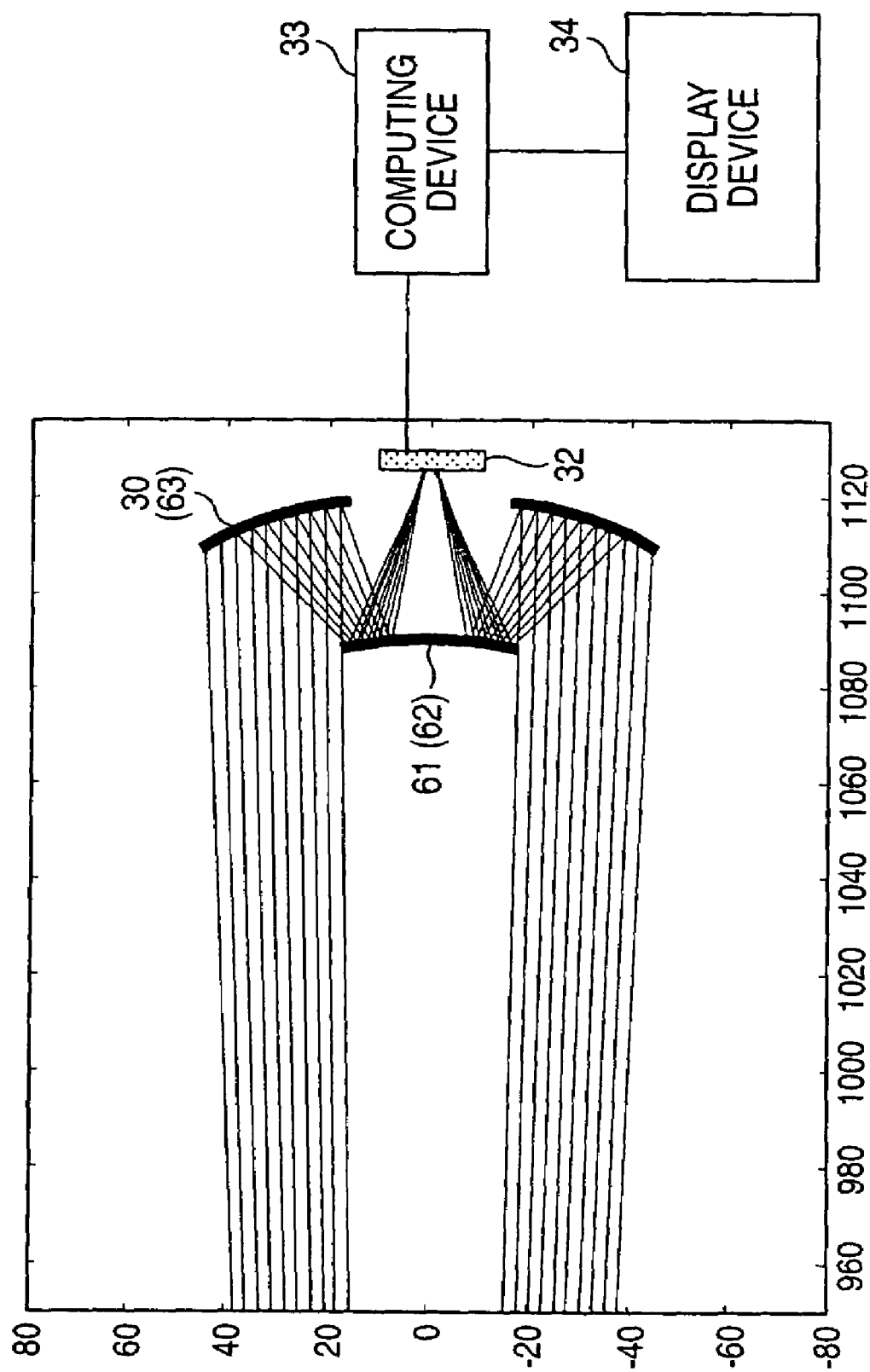
FIG. 22 is a conceptual rendering showing a ninth embodiment of the positional measurement system of the present invention.

FIG. 22 is a conceptual rendering showing a ninth embodiment of the positional measurement system according to the present invention. Here, explanations of those portions of the present embodiment which are the same as those of the sixth embodiment are omitted. A difference between the present embodiment and the sixth embodiment lies in that a convex mirror 61 rather than the lens is interposed between the light source and the mirror. Therefore, the area of the mirror 30 around the optical axis is eliminated, and the image sensor 32 is provided at a position in the extension of this area. As a result, the light traveling from the light source toward the mirror 30 is blocked by the mirror 61. Specifically, the mirror 61 plays the role of the light shield section 62. For this reason, the entrance window 63 by way of which the light arrives at the mirror 30 is formed at a position spaced away from the optical axis. The light reflected by the mirror 61 forms the light concentrated area, which is detected by the image sensor 32.

In the present modification, the distance from the light source to the mirror 61 in the optical axis is 1090 mm, the outer diameter of the entrance window 63 is 50 mm, the outer diameter of the light shield section 62 is 17 mm, the curvature radius of the mirror 30 is −100 mm, the distance from the mirror 30 to the mirror 61 in the optical axis is 30 mm, the curvature radius of the mirror 61 is −90 mm, and the distance from the image sensor 32 to the mirror 61 in the optical axis is 36 mm.

Thus, in the present embodiment, the light emitted from the LED light source is reflected by the mirror 30 having a large spherical aberration, and the mirror 61 further reflects the thus-reflected light, to thus form the light ring image which is the light concentrated area. This light ring image is detected by the image sensor 32. The detection signal is then subjected to the processing performed by the processing device 33, thereby computing the position of the light source.

Tenth Embodiment

Figure 23:
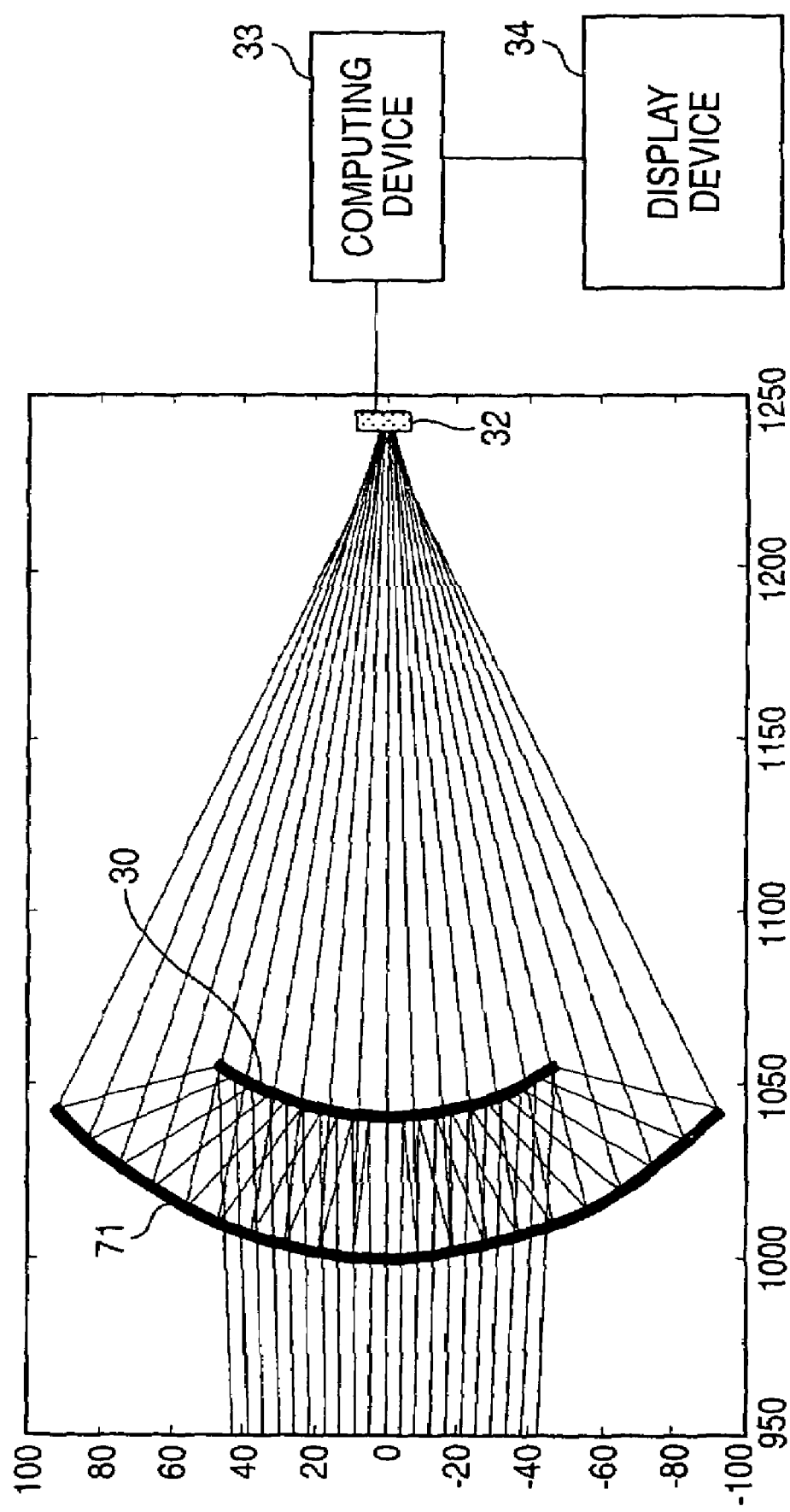
FIG. 23 is a conceptual rendering showing a tenth embodiment of the positional measurement system of the present invention.

FIG. 23 is a conceptual rendering showing a tenth embodiment of the positional measurement system according to the present invention. Here, explanations of those portions of the present embodiment which are the same as those of the sixth embodiment are omitted. A difference between the present embodiment and the sixth embodiment lies in that a half mirror 71 is provided on the part of the mirror 30 facing the light source. The image sensor 32 is disposed at rearward of the mirror 30. As a result, the light is reflected by a concave surface of the half mirror 71 to thereby form a light concentrated area, which is detected by the image sensor 32. The mirror 30 is embodied as the half mirror in the embodiment. However, the mirror 30 may be embodied as ordinary mirror.

In the present modification, the distance from the light source to the half mirror 71 in the optical axis is 1000 mm, the outer diameter of the entrance window 63 is 50 mm, the curvature radius of the mirror 30 is −80 mm, the distance from the mirror 30 to the half mirror 71 in the optical axis is 40 mm, the curvature radius of the half mirror 71 is 120 mm, and the distance from the image sensor 32 to the half mirror 71 in the optical axis is 240 mm.

Thus, in the present embodiment, the light emitted from the LED light source is reflected by the mirror 30 having a large spherical aberration, and the mirror 71 further reflects the thus-reflected light, to thus form the light ring image which is the light concentrated area. This light ring image is detected by the image sensor 32. The detection signal is then subjected to the processing performed by the processing device 33, thereby computing the position of the light source.

The sixth through tenth embodiments have been described on condition that the electromagnetic waves are light. In this case, the electromagnetic wave source corresponds to the light source, and the mirror corresponds to optical mirror. The electromagnetic wave component corresponds to an optical component. The receiving device corresponds to a light-receiving element array. However, the present invention is not limited to this configuration. For instance, as described in, e.g., connection with the fifth embodiment, the electromagnetic waves may be radio waves. Even when the radio waves may be millimeter waves (having a wavelength of 1 mm to 1 cm), microwaves having a wavelength (a wavelength of 1 cm to 10 cm) longer than that of the millimeter waves, or ultrashort waves (a wavelength of 10 cm to 1 m), positional measurement can be performed similarly. In this case, the electromagnetic wave source correspond to a radio wave transmitter, the electromagnetic wave components correspond to radio wave components, the mirror corresponds a radio wave mirror, and the receiving device corresponds to an antenna array.

As has been described above, the positional measurement system of the present invention forms a ring-shaped electromagnetic wave concentrated area from electromagnetic waves having passed through the lens system and/or mirror system, detects the size and position of the ring shape by the receiving device, and measures the three-dimensional position of the electromagnetic wave source at high speed with high accuracy based on the detected information by the computing device. Because of the spherical aberration of the lens system and/or that of the mirror system, this ring shape changes in accordance with a change in the distance of the source. Hence, the three-dimensional position of the electromagnetic wave source can be measured. Moreover, the three-dimensional positions of the plural electromagnetic wave sources can be detected by a set of lens systems and/or the mirror system and the receiving device. The electromagnetic wave concentrated area detected by the receiving device is the shape of a ring, and the hollow area of the ring shape does not involve superimposition in contrast with superimposition of a disk. Hence, plural ring images can be readily discerned.

The wavelength of the electromagnetic waves falls within the range of 300 nm to 1 m. The first lens surface exclusive of the electromagnetic wave shield section of the lens system can be formed into, e.g., the shape of a ring, as an entrance window for electromagnetic waves. The electromagnetic wave concentrated area formed by the lens system is the shape of, e.g., a ring. Here, the shape of a ring is assumed to encompass the shape of an entire ring, the shape of a part of a ring, and deformed shapes of a ring. An electromagnetic wave transmittance filter which permits transmittance of the electromagnetic waves and which blocks other electromagnetic noises can be disposed at a stage prior to the receiving device.

The lens system can be formed by including a first mirror surface disposed at a position distant from the center axis of the second lens surface opposing the first lens surface, and a second mirror surface disposed at the position of the electromagnetic wave shield section opposing the second lens surface. Each of the first lens surface, the second lens surface, and the second mirror surface can be a convex shape, and the first mirror surface can be a concave shape.

An electromagnetic wave diffusing member for forming the electromagnetic wave concentrated area is provided at a stage subsequent to the lens system, and an imaging lens system can be disposed at a stage subsequent to the electromagnetic wave diffusing member so that the receiving device can detect the electromagnetic wave concentrated area. The electromagnetic wave source can be formed into a member for reflecting electromagnetic waves having developed in an electromagnetic wave generator. Moreover, the electromagnetic wave source is provided in numbers.

The electromagnetic waves correspond to light. In this case, the electromagnetic wave source corresponds to a light source, the lens system corresponds to an optical lens system, and the receiving device is a light-receiving element array. An imaging lens system can be interposed between the optical lens system and the light-receiving element array. The electromagnetic waves correspond to, e.g., radio waves falling within a range from a millimeter wave band to a microwave band. In this case, the electromagnetic wave source corresponds to a radio wave transmitter, the lens system corresponds to a radio wave lens system, and the receiving device is an antenna array. The antenna array can be embedded in the second lens surface of the radio wave lens system.

The electromagnetic wave component can be embodied as a lens for concentrating the electromagnetic wave concentrated area on the receiving device by imparting a change to a traveling direction of the electromagnetic waves reflected by the mirror. Moreover, the electromagnetic wave component can be embodied as a lens which transmits the electromagnetic waves to the mirror and which imparts a change to a traveling direction of the electromagnetic waves, to thus concentrate the electromagnetic wave concentrated area on the receiving device. In this case, the lens can be disposed while remaining in close contact with the mirror. Further, the lens can be provided with a half mirror provided on a part thereof facing the electromagnetic wave source.

The lens can be embodied as a plano-convex lens having a flat surface on a part thereof facing the electromagnetic wave source. The plano-convex lens can be provided with a half mirror provided on a flat surface thereof facing the electromagnetic wave source. The plano-convex lens can have a concave lens surface in the vicinity of the center axis of a convex surface thereof. A convex surface of the plano-convex surface can be disposed while remaining in close contact with the mirror. Moreover, a convex surface of the plano-convex surface can have a mirror which reflects electromagnetic waves output from the mirror to thereby form an electromagnetic wave concentrated area on the receiving device.

The electromagnetic wave component can be embodied as a mirror which reflects electromagnetic waves output from the mirror to thereby form an electromagnetic wave concentrated area on the receiving device. The electromagnetic wave component can be embodied as a half mirror disposed on a part of the mirror facing the light source. The electromagnetic waves correspond to, e.g., light. In this case, the electromagnetic wave source corresponds to a light source, the mirror corresponds to an optical mirror, the electromagnetic wave component is an optical component, and the receiving device is a light-receiving element array. Moreover, the electromagnetic waves correspond to radio waves falling within the range from a millimeter wave band to a microwave band, the electromagnetic wave source corresponds to a radio wave transmitter, the electromagnetic wave component is a radio wave component, the mirror corresponds to a radio wave mirror, and the receiving device is an antenna array.

The first lens surface exclusive of the electromagnetic wave shield section can be formed into the shape of a ring. The electromagnetic wave concentrated area can be formed into the shape of a ring from the electromagnetic waves having passed through the neighborhood of an intermediate section of the ring-shaped first lens surface. A peak of electromagnetic wave intensity can appear in the outermost periphery of the ring-shaped electromagnetic wave concentrated area. Moreover, the lens system can further include a first mirror surface disposed at a position distant from the center axis of the second lens surface and a second mirror surface disposed at a position opposing the second lens surface of the electromagnetic wave shield section. The first lens surface, the second lens surface, and the second mirror surface each can be a convex shape, and the first mirror surface can be a concave shape. The first lens surface can be embodied as a flat surface, and the second lens surface can be embodied as a spherical surface. The electromagnetic waves are light or radio waves in the band of millimeter waves or microwaves.

The present invention can be utilized for a positional measurement system which measures a three-dimensional position of an electromagnetic wave source, e.g., the position of a light source. The present invention enables a compact, lightweight positional measurement system to simply measure the position of the source of electromagnetic waves at low costs.

The entire disclosure of Japanese Patent Application No. 2004-045123 filed on Feb. 20, 2004 including specification, claims, drawings and abstract is incorporated herein by reference in its entirety.

What is claimed is:

1. A positional measurement system, comprising:
an electromagnetic wave source which emits an electromagnetic wave;
a lens system, wherein the electromagnetic wave source is provided at one side of the lens system, and wherein the lens system has
a first lens surface,
an electromagnetic wave shield section provided at a center axis of the first lens surface and extended in all directions from the center axis of the first lens surface, and
a second lens surface to let out the electromagnetic wave entered from the first lens surface exclusive of the electromagnetic wave shield section to form an electromagnetic wave concentrated area on an other side of the lens system opposite the electromagnetic wave source;
a receiving device which detects the electromagnetic wave concentrated area formed by the lens system; and
a computing device which measures a position of the electromagnetic wave source based on information detected by the receiving device on the electromagnetic wave concentrated area.

2. The positional measurement system according to claim 1,
wherein a wavelength of the electromagnetic wave falls within the range of 300 nm to 1 m.

3. The positional measurement system according to claim 1,
wherein the first lens surface exclusive of the electromagnetic wave shield section of the lens system is in a shape of a ring.

4. The positional measurement system according to claim 1,
wherein the electromagnetic wave concentrated area formed by the lens system is a shape of a ring.

5. The positional measurement system according to claim 1, further comprising:
an electromagnetic wave transmittance filter which is disposed at a stage prior to the receiving device, and permits transmission of the electromagnetic wave and rejects other electromagnetic waves.

6. The positional measurement system according to claim 1,
wherein the lens system includes:
a first mirror surface encircling a center axis of the second lens surface opposing the first lens surface; and
a second mirror surface disposed at a position of the electromagnetic wave shield section opposing the second lens surface.

7. The positional measurement system according to claim 6,
wherein each of the first lens surface, the second lens surface, and the second mirror surface is a convex shape, and the first mirror surface has a concave shape.

8. The positional measurement system according to claim 1, further comprising:
an electromagnetic wave diffusing member provided at a position after the lens system that forms the electromagnetic wave concentrated area; and
an imaging lens system disposed at a position after the electromagnetic wave diffusing member to detect the electromagnetic wave concentrated area by the receiving device.

9. The positional measurement system according to claim 1,
wherein the electromagnetic wave source is a member which reflects an electromagnetic wave generated by an electromagnetic wave generator.

10. The positional measurement system according to claim 1,
wherein the plurality of electromagnetic wave sources are provided.

11. The positional measurement system according to claim 1,
wherein the electromagnetic wave is light,
the electromagnetic wave source is a light source,
the lens system is an optical lens system, and the receiving device is a light-receiving element array.

12. The positional measurement system according to claim 11, wherein an imaging lens system is provided between the optical lens system and the light-receiving element array.

13. The positional measurement system according to claim 1,
wherein the electromagnetic wave is a radio wave in a band of millimeter waves or microwaves,
the electromagnetic wave source is a radio wave transmitter,
the lens system is a radio wave lens system, and
the receiving device is an antenna array.

14. The positional measurement system according to claim 13,
wherein the antenna array is embedded in the second lens surface of the radio wave lens system.

15. A positional measurement system, comprising:
an electromagnetic wave source which emits an electromagnetic wave;
a first mirror which reflects the electromagnetic wave, to form an electromagnetic wave concentrated area;
an electromagnetic wave component which is interposed between the electromagnetic wave source and the first mirror, and imparts a change to a direction of the electromagnetic wave;
a receiving device which detects the electromagnetic wave concentrated area formed by the mirror; and
a computing device which measures a position of the electromagnetic wave source based on information detected by the receiving device on the electromagnetic wave concentrated area;
wherein the electromagnetic wave component is a lens which transmits the electromagnetic wave to the mirror, and imparts a change to a direction of the electromagnetic wave, to concentrate the electromagnetic wave concentrated area on the receiving device;
wherein the electromagnetic wave concentrated area has a shape of a ring; and
wherein the lens is contacting the first mirror.

16. A positional measurement system according to claim 15,
wherein the computing device measures a 3-D position of the electromagnetic wave source.

17. The positional measurement system according to claim 15, wherein the information includes a size of the ring and a position of the ring.

18. The positional measurement system according to claim 15,
wherein the lens has a half mirror provided on a part facing the electromagnetic wave source.

19. A positional measurement system, comprising:
an electromagnetic wave source which emits an electromagnetic wave;
a first mirror which reflects the electromagnetic wave, to form an electromagnetic wave concentrated area;
an electromagnetic wave component which is interposed between the electromagnetic wave source and the first mirror, and imparts a change to a direction of the electromagnetic wave;
a receiving device which detects the electromagnetic wave concentrated area formed by the first mirror; and
a computing device which measures a position of the electromagnetic wave source based on information detected by the receiving device on the electromagnetic wave concentrated area;
wherein the electromagnetic wave component is a lens which transmits the electromagnetic wave to the mirror, and imparts a change to a direction of the electromagnetic wave, to concentrate the electromagnetic wave concentrated area on the receiving device;
wherein the electromagnetic wave concentrated area has a shape of a ring; and
wherein the lens has a half mirror provided on a part facing the electromagnetic wave source.

20. A positional measurement system, comprising:
an electromagnetic wave source which emits an electromagnetic wave;
a first mirror which reflects the electromagnetic wave, to form an electromagnetic wave concentrated area;
an electromagnetic wave component which is interposed between the electromagnetic wave source and the first mirror, and imparts a change to a direction of the electromagnetic wave;
a receiving device which detects the electromagnetic wave concentrated area formed by the first mirror; and
a computing device which measures a position of the electromagnetic wave source based on information detected by the receiving device on the electromagnetic wave concentrated area;
wherein the electromagnetic wave component is a lens which transmits the electromagnetic wave to the mirror, and imparts a change to a direction of the electromagnetic wave, to concentrate the electromagnetic wave concentrated area on the receiving device;
wherein the electromagnetic wave concentrated area has a shape of a ring; and
wherein the lens is a plano-convex lens having a flat surface on a part facing the electromagnetic wave source.

21. The positional measurement system according to claim 20, wherein the plano-convex lens has a half mirror provided on the flat surface facing the electromagnetic wave source.

22. The positional measurement system according to claim 20,
wherein the convex surface of the plano-convex lens has a second mirror which reflects the electromagnetic wave from the first mirror, to form the electromagnetic wave concentrated area on the receiving device.

23. The positional measurement system according to claim 21,
wherein the plano-convex lens has a concave lens surface at a center axis of a convex surface.

24. The positional measurement system according to claim 21,
wherein the convex surface of the plano-convex lens is contacting the half mirror.

25. The positional measurement system according to claim 23,
wherein the convex surface of the plano-convex lens is contacting the half mirror.

26. A positional measurement system, comprising:
an electromagnetic wave source which emits an electromagnetic wave, and
a lens system, comprising:
a first lens surface;
an electromagnetic wave shield section provided at a center axis of the first lens surface and extended in all directions from the center axis of the first lens surface; and
a second lens surface,
wherein, the electromagnetic wave entered by way of the first lens surface exclusive of the electromagnetic wave shield section is caused to exit from the second lens surface, to form an electromagnetic wave concentrated area;

wherein the first lens surface exclusive of the electromagnetic wave shield section is in a shape of a ring;

wherein the first lens surface has a convex shape;

further comprising a first mirror surface encircling a center axis of the second lens surface; and a second mirror surface disposed at a position opposing the second lens surface, wherein the second lens surface has a convex shape, and the second mirror surface has a convex shape, and the first mirror surface has a concave shape;

and wherein a position of the electromagnetic wave source is measured.

27. The positional measurement system according to claim 26, wherein the electromagnetic wave concentrated area is formed in a shape of a ring by the electromagnetic wave having passed through an intermediate section of the first lens surface being in a shape of a ring.

28. The positional measurement system according to claim 27, wherein a peak of electromagnetic wave intensity appears in an outermost periphery of the electromagnetic wave concentrated area.

29. The positional measurement system according to claim 26, wherein the electromagnetic wave is light.

30. The positional measurement system according to claim 26, wherein the electromagnetic wave is a radio wave in a band of millimeter waves or microwaves.

* * * * *